United States Patent [19]
Ishikawa et al.

[11] Patent Number: 5,260,735
[45] Date of Patent: Nov. 9, 1993

[54] CAMERA SYSTEM

[75] Inventors: Norio Ishikawa, Osaka; Masaaki Nakai, Kawachinagano; Masayasu Hirano, Nishinomiya; Akihiko Fujino; Hiroshi Ootsuka, both of Sakai; Takeshi Egawa, Sennan; Kunio Kawamura, Sakai, all of Japan

[73] Assignee: Minolta Camera Kabushiki Kaisha, Osaka, Japan

[21] Appl. No.: 900,751

[22] Filed: Jun. 19, 1992

Related U.S. Application Data

[60] Continuation of Ser. No. 643,182, Jan. 18, 1991, abandoned, which is a division of Ser. No. 552,467, Jul. 16, 1990, Pat. No. 5,040,016, which is a division of Ser. No. 278,033, Nov. 30, 1988, Pat. No. 4,958,181, which is a division of Ser. No. 122,243, Nov. 18, 1987, Pat. No. 4,855,779.

[30] Foreign Application Priority Data

| Nov. 19, 1986 | [JP] | Japan | 61-275546 |
| Nov. 19, 1986 | [JP] | Japan | 61-275547 |
| Nov. 19, 1986 | [JP] | Japan | 61-275548 |
| Nov. 19, 1986 | [JP] | Japan | 61-275549 |
| Nov. 19, 1986 | [JP] | Japan | 61-275550 |
| Nov. 19, 1986 | [JP] | Japan | 61-275551 |
| Nov. 19, 1986 | [JP] | Japan | 61-275552 |

[51] Int. Cl.⁵ .............................. G03B 17/00
[52] U.S. Cl. .................. 354/289.1; 354/412; 354/474
[58] Field of Search ............... 354/289.1, 412, 286, 354/474, 475

[56] References Cited

U.S. PATENT DOCUMENTS

| 4,286,849 | 9/1981 | Uchidoi et al. | 354/289.1 |
| 4,728,978 | 3/1988 | Inoue et al. | 354/289.1 |
| 4,884,092 | 11/1989 | Inoue et al. | 354/289.1 |
| 4,887,115 | 12/1989 | Inoue et al. | 354/289.1 |
| 5,036,344 | 7/1991 | Inoue et al. | 354/289.1 |

Primary Examiner—Russell E. Adams
Attorney, Agent, or Firm—Burns, Doane, Swecker & Mathis

[57] ABSTRACT

A camera system being comprised of a camera and an external device is disclosed. The external device is detachably mounted on the camera which memorizes a program or data necessary for executing a program therein.

When the external device is mounted on the camera, they are connected electrically with each other and communicate therebetween in order to read a program or data memorized in the external device into a memory means provided in the camera. The camera is controlled according to the program designated by the external device.

10 Claims, 24 Drawing Sheets

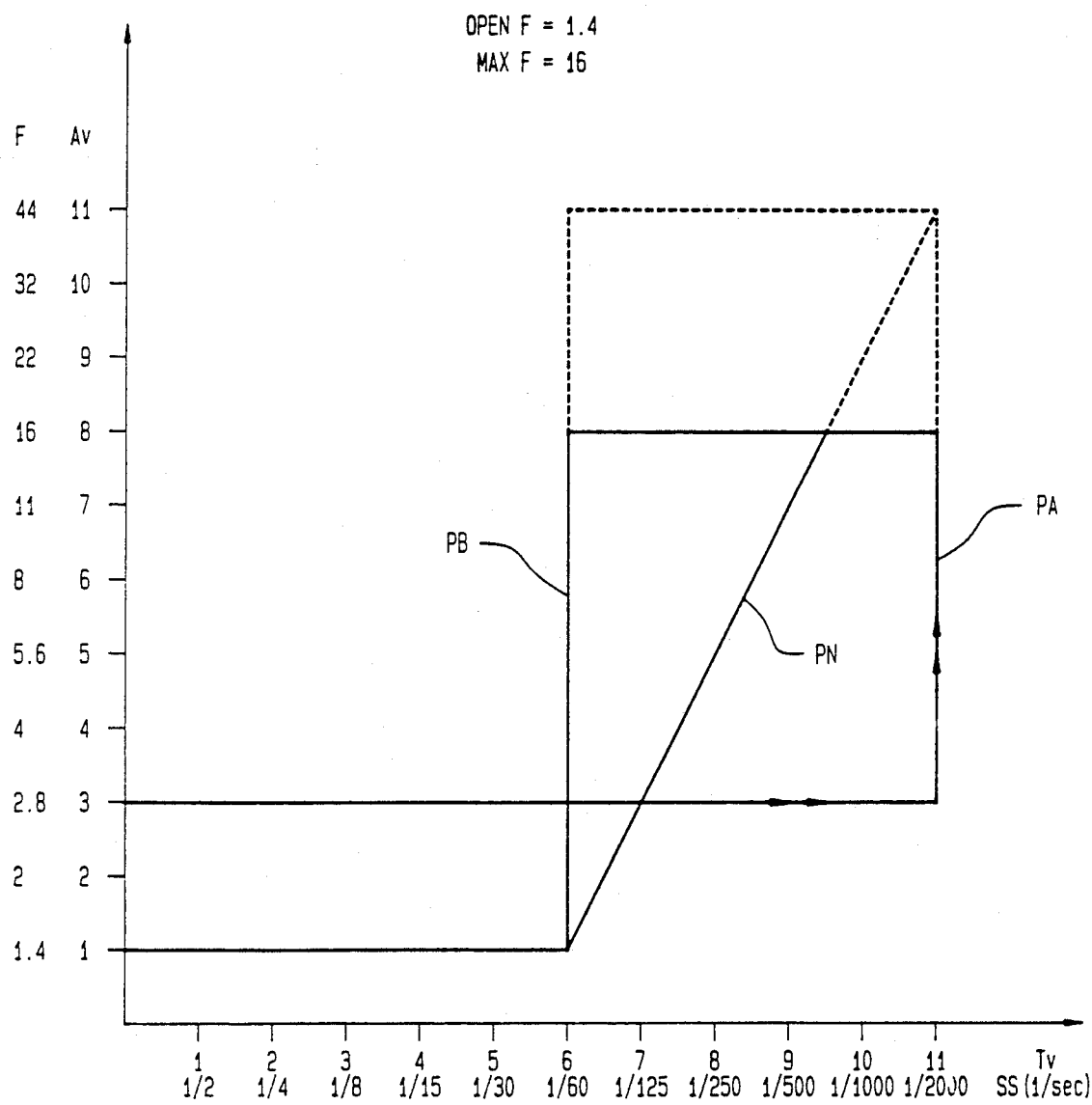

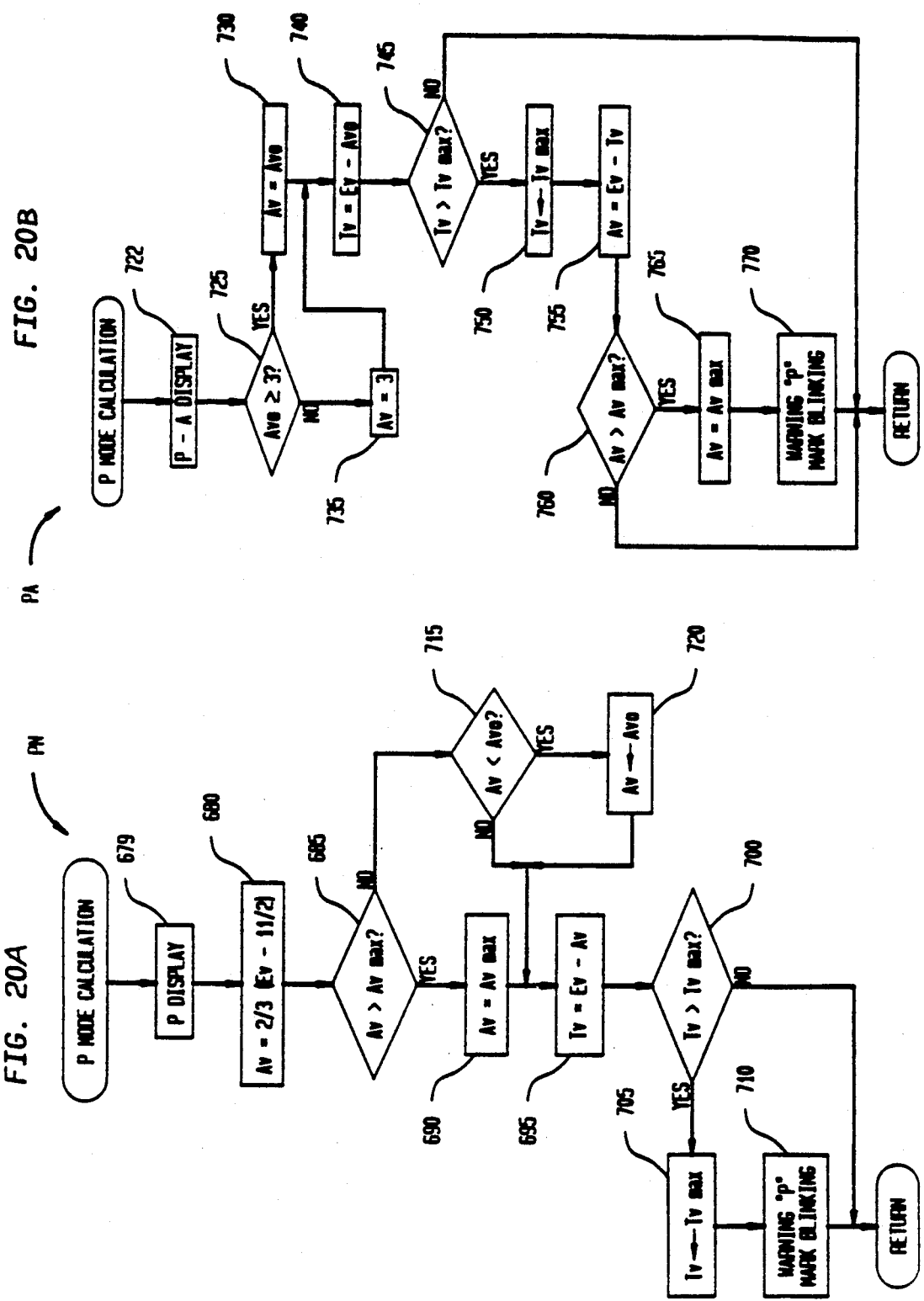

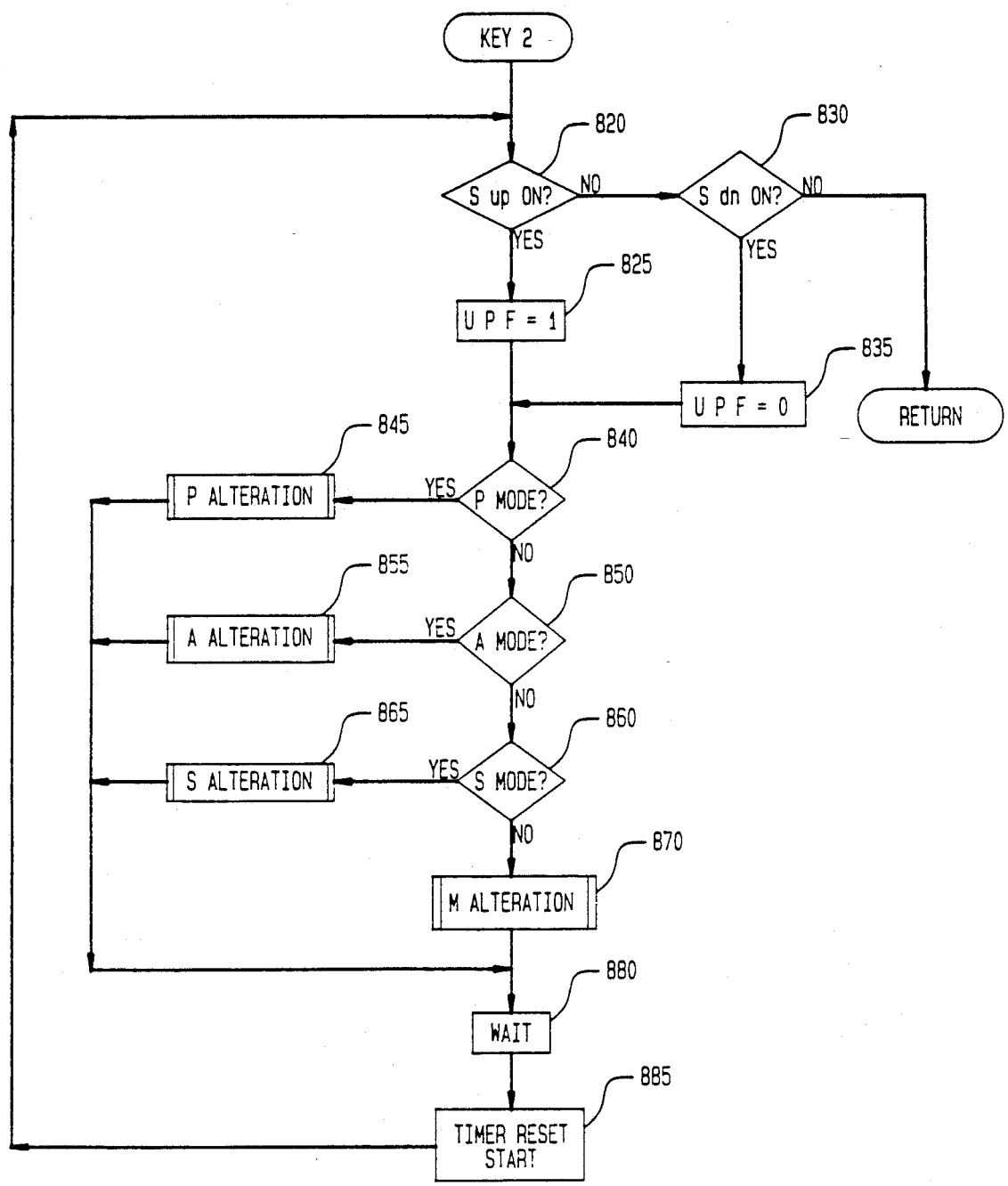

CAMERA SYSTEM

This application is a continuation of application Ser. No. 07/643,182, filed Jan. 18, 1991, now abandoned which is a divisional of application Ser. No. 07/552,467, filed Jul. 16, 1990, now U.S. Pat. No. 5,040,016, which is a divisional of application Ser. No. 07/278,033, filed Nov. 30, 1988, now U.S. Pat. No. 4,958,181, which is a divisional of application Ser. No. 07/122,243, filed Nov. 18, 1987, now U.S. Pat. No. 4,855,779.

BACKGROUND OF THE INVENTION

1. Field of the Invention

The present invention is related to a camera system comprised of a camera and an external device such as an IC (integrated circuit) card having memorized information necessary for operating the camera and for taking pictures actually.

2. Description of the Prior Art

Recently, various automatic single-lens reflex cameras are commercially available. In such a camera, one or more micro-computers are installed for the automatic exposure control and automatic focusing so as to position the objective lens at an in-focus position automatically.

This enables very beginners to take pictures easily with use of such a single-lens reflex camera which had been considered to be possible to use only by experts. Accordingly, needs thereof will be increased more and more.

The camera of this type is required to have various functions in order to respond to various levels of users. Namely, the camera must satisfy various requirements required from an expert to a beginner. However, as functions of the camera are multiplied much more, operations for choosing desired functions become complex. This may spoil the merit of the camera of this type.

From this point of view, in JP-A 107339/1979, there is proposed a camera into which a ROM board can be inserted.

In the camera of this type, one of specific functions such as determination of an exposure mode, determination about the necessity of display in the view finder, determination about the necessity for warning when a number of available frames of a film presently used becomes few and so on corresponding to a need by a user is designated selectively by the insertion of a desired ROM board.

Namely, the camera of this type is intended to simplify operations thereof by designating one or more desired functions selectively among various functions provided therein with use of the ROM board.

The system wherein all of functions considered to be necessary are provided beforehand and one or more specific functions are designated among those functions is very attractive to the user. However, it imposes such a burden on individual users that they have to understand all contents of functions provided in the camera among which functions not so necessary for them are included and to select or designate among them.

SUMMARY OF THE INVENTION

One of objects of the present invention is to provide a camera system capable of adding functions to the camera and/or altering functions corresponding to various needs by individual users.

Another object of the present invention is to provide a camera which does not need to provide all of functions required, in other words, which provides only functions essential to the camera.

A further object of the present invention is to provide an external device which is able to give one or more functions to the camera or to alter functions provided beforehand in the camera.

In order to accomplish these objects, according to the present invention, there is provided a camera system comprised of a camera and an external device to be mounted thereon wherein the external device includes: a data store means for storing data on a function alterable in the camera and to be carried out by the camera, electric terminals for connecting the external device to the camera electrically, and a data output means for outputting the stored data, via the electric terminals, to the camera, and the camera includes: electric terminals being connected to the electric terminals of the external device, a data input means for inputting data fed from the external device via the electric terminals of the camera and those of the external device, a memory means for memorizing data having been input from the data store means via the data output means and the data input means, and a control means which includes a selection means for selecting one of functions to be carried out by the camera according to the input data being memorized in the memory means, said control means controlling the camera according to the selected function.

According to the second invention of the present invention, there is provided a camera on which an external device having a data store means for storing data on a function alterable in the camera and to be carried out by the camera, data output means for outputting the stored data to the camera is detachably mounted, the external device comprising: electric terminals being connected to the external device, a data input means for inputting data fed from the external device via the electric terminals, a memory means for memorizing data having been input to the data input means and a control means which includes a selection means for selecting one of functions to be carried out by the camera according to the input data being memorized in the memory means, said control means controlling the camera according to the selected function.

According to the third invention of the present invention, there is provided an external device to be detachably mounted on a camera having a data input means for inputting data input thereto and a memory means for memorizing data having been input, said external device comprising a data store means for storing data on a function alterable in the camera and to be carried out by the camera, electric terminals for connecting the external device to the camera electrically and a data output means for outputting data, via the electric terminals, to the camera.

According to the present invention, it becomes possible to add or alter functions corresponding to various needs by users and, accordingly, a number of functions to be provided beforehand in a camera can be minimized. Therefore, the camera-system according to the present invention satisfies various needs by users without multiplying complexity of the camera.

BRIEF DESCRIPTION OF DRAWINGS

These and other objects and features of the present invention will become more apparent when the preferred embodiment of the present invention is described in detail with reference to accompanied drawings in that:

FIG. 19 is a graph showing programed diagrams to be set or altered, FIGS. 20A, 20B, and 20C are flow charts for setting individual programmed diagrams shown in FIG. 19, respectively, FIG. 21 is a flow chart of Key 2 routine, FIG. 26A is a flow chart of a variation of DEMO-routine shown in FIG. 26.

DESCRIPTION OF THE PREFERRED EMBODIMENT

Composition of Camera

Figure 2:
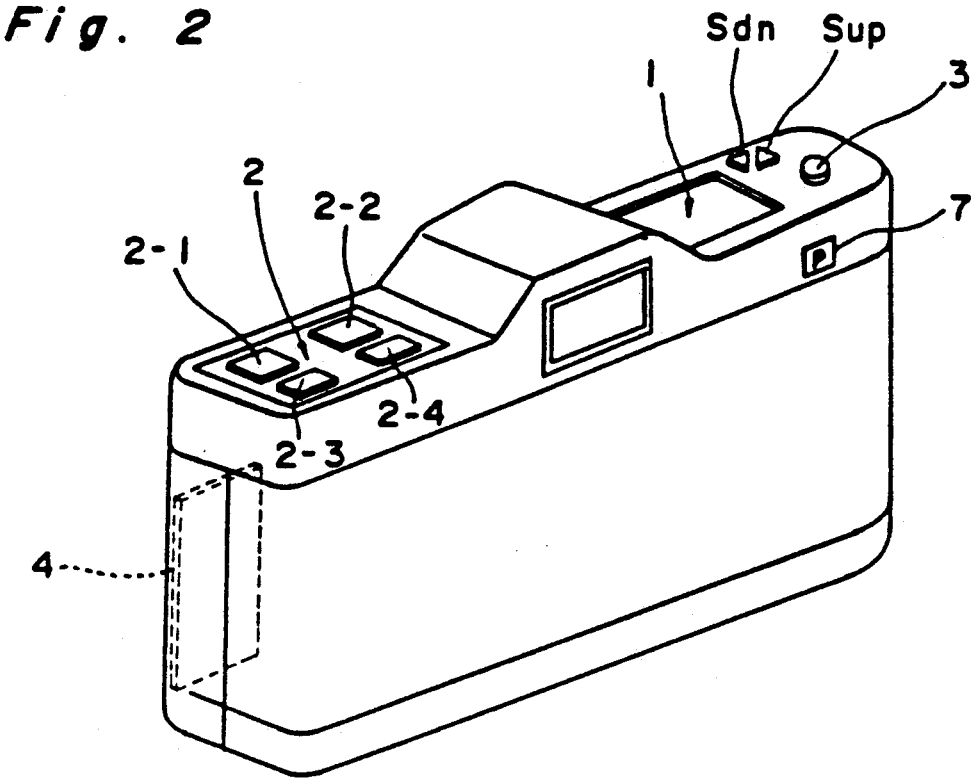
FIG. 2 is a rear perspective view of a camera according to the present invention.

FIG. 2 is a perspective view seen from the rear side of a camera according to the preferred embodiment.

A liquid-crystal display device 1 for displaying various photo-taking information is arranged on one side of the upper plane of a camera body. On the other side of the upper plane, a switch portion 2 having four mode switches 2-1, 2-2, 2-3 and 2-4 is arranged. The switch portion 2 has desirably a structure such that four mode switches are arranged on a liquid crystal display pattern and each mode switch is comprised of a pair of upper and lower electrodes between which a spacer is inserted and when either one of them is depressed lightly, it is switched ON.

Further, a release button 3, up and down switches Sup and Sdn for increasing and decreasing a value of numerical data displayed on the liquid crystal display 1 are arranged at one side of the display 1.

On the upper portion of a back lid of the camera body, there is provided a program switch 7 for setting a programmed exposure control mode directly.

Figure 3:
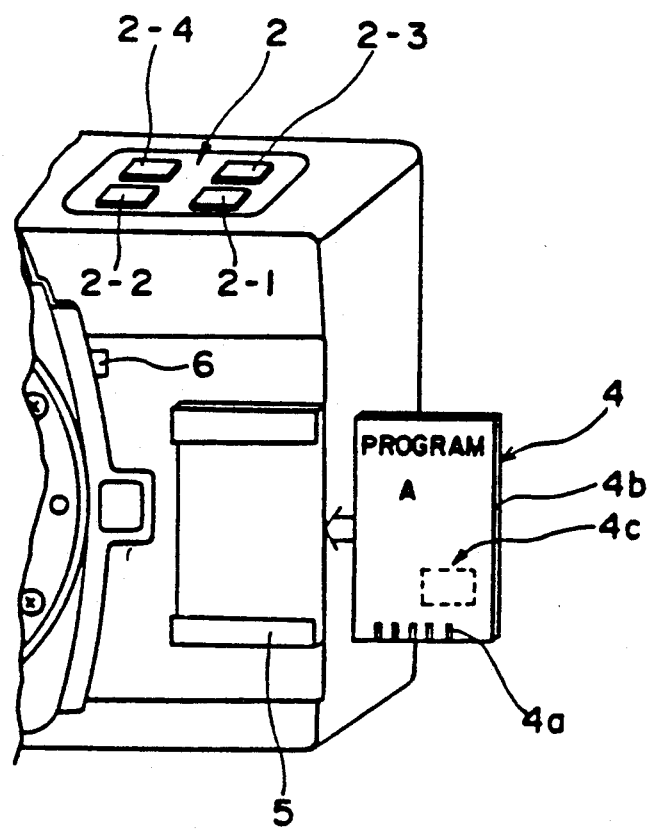
FIG. 3 is a partial perspective view of the camera, seen from the front side.

As shown in FIG. 3, an IC card 4 (integrated circuit card) into which suitable program and/or data are written can be set by inserting into a holder 5 being provided on the front side of the camera body. As will be explained hereinafter, three kinds of IC cards such as an exposure-program card (A-type or B-type), a mode-set alteration card and a demonstration card (hereinafter referred to as DEMO card) are prepared as IC cards and either one of them is set according to its necessity. Each IC card 4 has a fundamental structure such that a group of electrodes (electric terminals) $4a$ and an IC $4c$ into which a program or data is stored are formed on a substrate $4b$.

On the front side of the camera body, a switch 6 is provided for changing the diaphragm aperture value when a manual mode is chosen. In order to change the diaphragm in the manual mode, the switch 6 is switched on at first end, then, the up or down switch Sup or Sdn is operated to set the diaphragm aperture value at a desired value while keeping the switch 6 ON.

Figure 4:
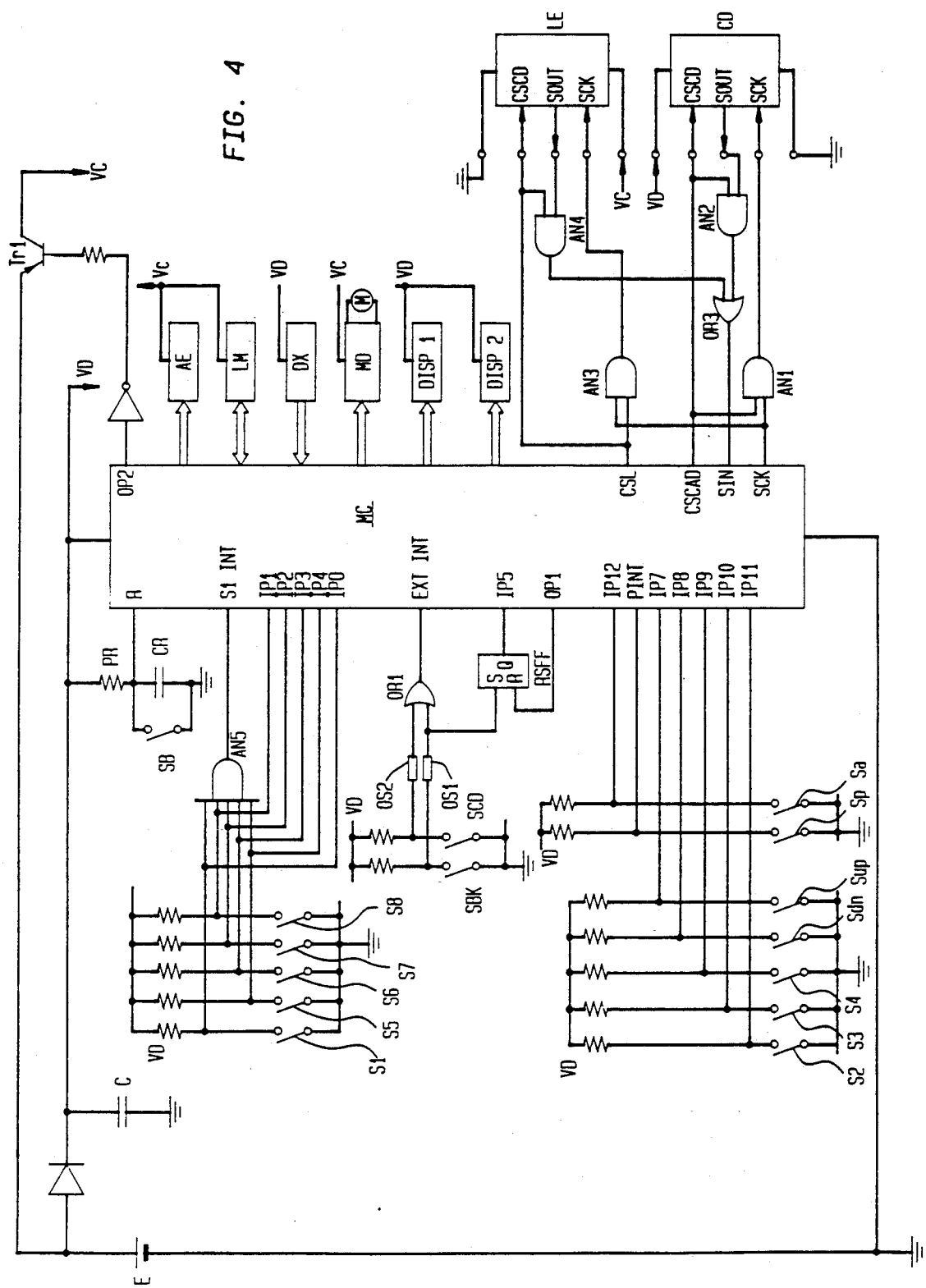
FIG. 4 is a block diagram of a control system of the camera according to the present invention.

FIG. 4 shows a block diagram of a control circuit for controlling the camera. In FIG. 4, E denotes a battery as a power supply, D1 denotes a diode for protecting against reversal charging, C denotes a back-up capacitor, $R_R$ and $C_R$ denote a register and a capacitor for generating a reset signal, respectively, Tr1 denotes a power supply transistor and MC denotes a micro-computer provided for executing sequential controls of the camera and performing various controlling calculations. In this micro-computer, an E$^2$PROM (electrically erasable PROM) and a boosting circuit for generating a voltage necessary to write digital data into E$^2$PROM are provided. Further, AE denotes an exposure-control circuit for controlling every exposure based upon exposure data from the micro-computer MC. LM denotes a light measuring circuit, DX denotes a circuit for reading the sensitivity of a film automatically. These two circuits LM and DX output digital values in APEX unit to the micro-computer, respectively. MD denotes a motor control circuit for controlling a film winding motor M according to signals from the micro-computer MC. DISP1 and DISP2 denote display devices, respectively, and display information based on instructions by the micro computer MC. Display method thereby will be explained in detail hereinafter. LE denotes a lens data circuit which is provided at the side of each interchangeable objective lens and outputs lens data intrinsic for the lens to the micro-computer. CD denotes an interchangeable IC card which outputs card information (program information) stored therein to the micro-computer MC. This will be explained in detail hereinafter.

Next, various switches shown in FIG. 4 are explained.

S1 denotes a ready switch for photo-taking which is switched on when the release button 3 is depressed by the first stroke thereof. S5, S6, S7 and S8 are switches of normal-open type for setting individual modes and are assigned for setting single/continuous photo-taking, setting the sensitivity of a film, setting one of exposure control modes hereinafter referred to AE mode) and setting exposure compensation amounts. In this embodiment, the AE mode includes a programmed automatic exposure control mode (hereinafter referred to P mode), a diaphragm aperture priority automatic exposure control mode (hereinafter referred to A mode), a shutter speed priority automatic exposure control mode (hereinafter referred to S mode) and a manual exposure control mode (hereinafter referred to M mode).

When either one of these switches S1, S5 to S8 is switched on, a signal having been changed from "high-level" to "low-level" is input to an input port S1INT of the microcomputer MC via an AND gate AN5 and the micro-computer MC executes an interruption program S1INT (which will be explained later).

SBK denotes a switch which is switched on when the back lid is closed, SCD denotes a switch which is switched on when an IC card CD is inserted into the holder 56, OS1 denotes a one-shot circuit which outputs one pulse when the switch SBK is switched on and OS2 denotes a one-shot circuit which outputs one pulse when the switch SCD is switched from ON to OFF or vice versa. When either one of these two one-shot circuit OS1 and OS2 outputs one pulse, it is input, via an OR gate OR1, to an external interruption port (EXTINT) and the micro-computer MC executes an interruption program (EXT INT) which will be explained later). S2 denotes a release switch which is switched on when the relese button is depressed by the second stroke thereof (the second stroke is larger than the first one), S3 denotes a switch which is switched on when the second shutter of a focal-plane-shutter of the camera has finished its running, S4 is a switch which is switched on when the film has been wound up by one frame.

The switches Sdn and Sup have been already explained. Sp denotes a program switch corresponding to the switch 7 shown in FIG. 2 for setting P mode as AE mode directly. SA denotes a switch which corresponds to the switch 6 shown in FIG. 2 and becomes effective when AE mode is M mode. When the switch SA is turned on, it becomes possible to change the diaphragm aperture value in M mode.

Next, various controls of the camera will be explained referring to flow-charts shown in FIG. 5 and FIGS. thereafter.

Initial Set

When the battery E is inserted into the camera body, a switch $S_B$ (see FIG. 4) is switched off and the capacitor $C_R$ connected parallel to the switch $S_B$ is started to charge. When a charged voltage of the capacitor $C_R$ exceeds a predetermined value and therefore, a reset port R of the micro-computer becomes "high level", the micro-computer MC executes a reset routine RESET shown in FIG. 5.

In this routine the micro-computer MC inhibits all of interruptions to this flow at first and resets all flags and output ports in an internal RAM (steps #5 and #10). Then, the process proceeds to a subroutine for processing an IC card (step #15). This subroutine is also executed when the card is inserted or extracted or when the ready switch S1 is switched on.

Figure 1:
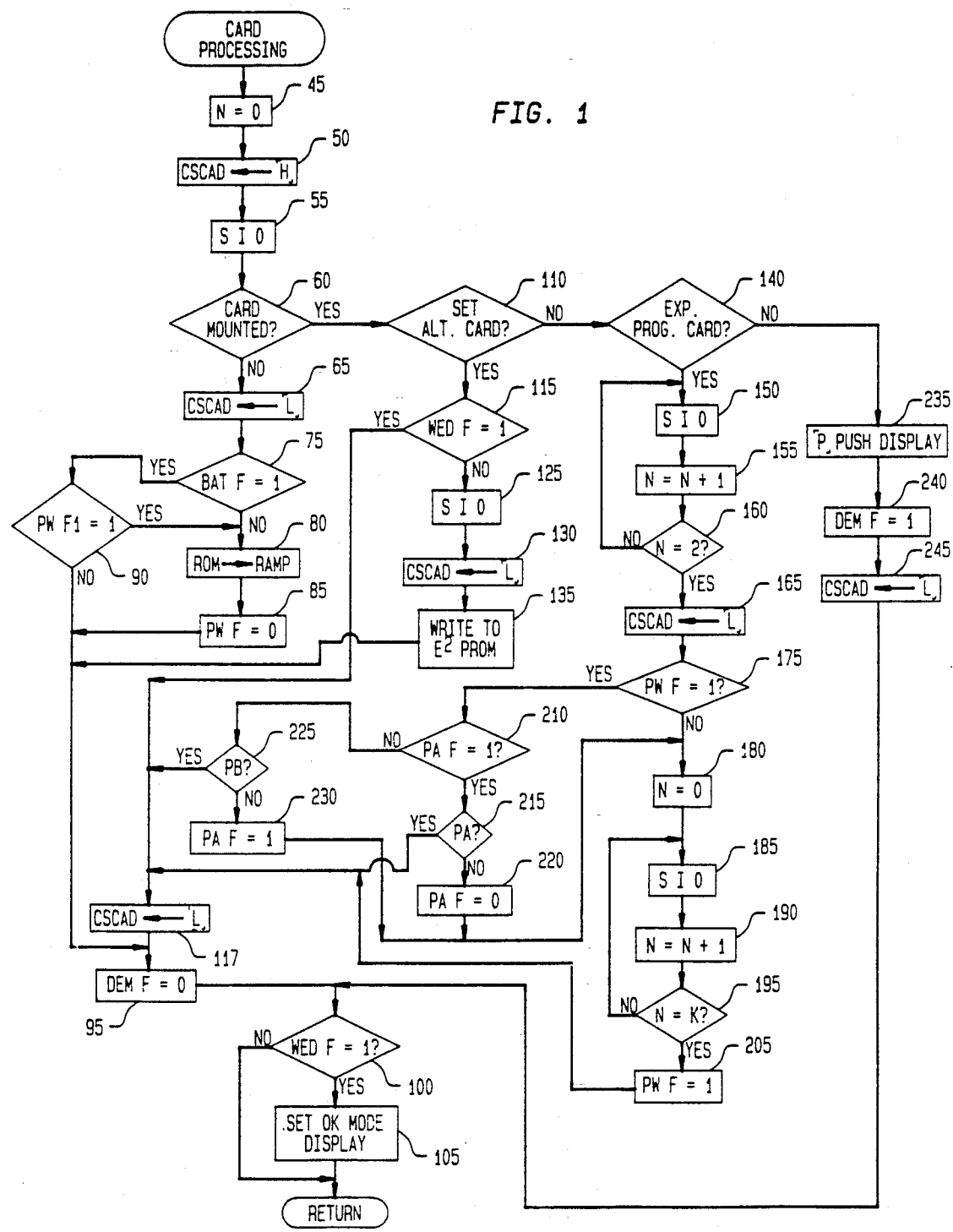
FIG. 1 is a flow chart of one of main programs according to the present invention.

This subroutine is shown in FIG. 1.

The micro-computer MC makes a variable N "zero" (step #45) and a terminal CSCAD (see FIG. 4) "high level" (step #50) and communicates with the IC card (DC) serially to input data of 1 byte (step #55). This serial communication is done as follows. Referring to FIG. 4, when the terminal CSCAD becomes "high level", two AND gates AN1 and AN2 are made enable. The micro-computer MC outputs eight pulses from a terminal SCK and these pulses are input, via the AND gate AN1 to a terminal SCK of the IC card CD. Correspondingly thereto, the IC card outputs a signal of one bit from a terminal Sout in synchronization with the rising of each pulse. The micro-computer MC accesses the one bit signal from an input terminal SIN via the AND gate AN2 and OR gate OR3 in synchronization with the drop of each pulse.

This process is repeated eight times and then, one serial communication is completed.

The content of entry data by the serial communication is shown in Table 1.

TABLE 1

| bit | signal | content |
|---|---|---|
| b1,b0 | 00 | NO Card |
| | 01 | Mode Set Alteration Card |
| | 10 | EXP program Card |
| | 11 | DEMO Card |

As is apparent from Table 1, the existence of the card and the kind thereof are decided based on a signal of two bits b1 and b0.

Again referring to FIG. 1, the micro-computer MC decides, based on the entry data, whether the IC card is inserted to the camera or not (step #60). If the card is not inserted, the micro-computer makes the terminal CSCAD "low level" in order to indicate the end of the data communication (step #65) and, then, checks whether the battery is inserted into the camera or not from the battery flag BATF (step #75). Since the battery flag BATF has been reset upon insertion of the battery, the micro-computer loads an exposure program stored in an internal ROM to an area RAMP of the internal RAM (step #80), and resets a flag PWF which indicates that the exposure program is designated by the IC card (step #85), and, then, the process proceeds to step #95.

On the contrary to the above, if the battery flag BATF has been set, the program decision flag is checked (step #90). If it is set, the process proceeds to step #80 since it is considered that this subroutine is executed when the IC card is detached. If the program decision flag PWF is not set, the process proceeds to step #95 since the exposure program has been loaded into the area RAMP of the internal RAM. At step #95, a DEMO card flag DEMF which indicates the insertion of DEMO card is reset. Next, a flag WEDF which indicates that a mode is possible to set is checked (step #100). Since the mode-set OK flag WEDF is a flag to be written into $E^2$PROM of the micro-computer MC, it is not reset irrespective of extraction or insertion of the battery as far as it has been written therein.

If the mode-set OK flag has been set, "mode possible to set or alter" is displayed and the process returns (step #105).

If it has not been set, the process skips step #105 to return. Hereinafter, the mode display and mode-set switches (see FIG. 2) are explained referring to FIG. 6.

Figure 6:
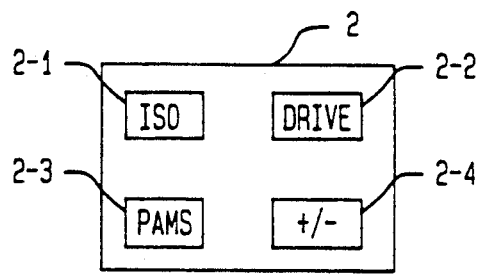
FIG. 6 is a plan view showing switches for setting modes.

As shown in FIG. 6, the switch portion 2 formed with a liquid crystal device is an area wherein four marks corresponding to four mode-set switches 2-1 to 2-4 are indicated within a frame and, once a mode-set alteration IC card is inserted, it is displayed thereafter even if the card is extracted. If the card has not been inserted yet, it is not displayed of course.

This display device 2 corresponds to the second display device DISP 2 of FIG. 4 and has switching functions for altering modes such that, when either one of four marks is depressed lightly, an alteration of set value of the mode corresponding to the depressed portion or the mode its self becomes possible.

Again, let's return to the flow-chart of FIG. 1.

If it is decided at step #60 that the IC card has been inserted, the micro-computer MC determines a kind of the IC card based on the data entered at step #55.

If the IC card is a mode-set alteration card (step #110), the process proceeds to step #115.

At step #115, the mode-set OK flag WEDF is read out of E²PROM and checked (the way for reading data from E²PROM is substantially same to that of ROM.). If it has been set, the terminal CSCAD is made "low-level" to indicate a finish of data communication since a mode-set has become possible, and then, the process proceeds to step #95.

If it has not been set, the serial communication (SIO) is continued until the completion thereof (step #125) and, then, the terminal CSCAD is made "low-level" (step #130). At the next step #135, the micro-computer MC writes the entry data such as CHISF, CHAEF, CHDRF, CHCOMF and WEDF (if it has been set) into E²PROM and, then, the process proceeds to step #95.

If the card inserted is the exposure program card, the process proceeds from step #140 to step #150 in order to do a serial communication. A number N is added by one (step #155) and the result is checked to be equal to "2" or not (step #160). If N≠2, the terminal CSCAD is made "low-level" and the data communication of 2 bytes is finished (step #165), If N=2, the process returns to step #150 to continue the serial communication.

The contents of data of 2 bytes to be read from the exposure program card by the serial communication are as follows: eleven bits of them represent a number of bytes necessary for written data (until about 2K bytes) and other 5 bits are used for designating a kind of the present program (32 kinds can be provided at the maximum.). Although two kinds of the exposure program are used in the present preferred embodiment, various exposure programs can be added.

The micro-computer, when the 2 bytes data communication is finished, checks the program-load flag PWF which indicates whether the contents memorized in the IC card are loaded into the area RAMP or RAM or not (step #175). If it is not set, the process proceeds to step #180 to set N to zero and, then, the serial communication is started to read the contents of the exposure program (step #185). The number N is incremented by one at every data communication and the data communication is continued until N becomes equal to K which is a number of bytes having been entered at steps #150, #155, #160 (step #195). If N becomes equal to K, the program-load flag PWF is set which indicates that the contents of the exposure program have been loaded and, then, the process proceeds to step #117. As mentioned above, data of the exposure program read from the IC card are loaded into the area RAMP of RAM of the microcomputer.

If the program-load flag PWF has been set already (at step #175), the process proceeds to step #210 and it is checked whether an A-type flag PAF is set which indicates that the exposure program now memorized in the RAMP is A-type. If it has been already set, it is decided whether the exposure program of the IC card inserted at the present time is also A-type or not at step #215. If it is A-type, the process proceeds to step #117 to finish the data communication without loading the contents of the IC card. If it is not A-type, the A-type flag PAF is reset and the process proceeds to step #180 and, then, through steps #185–#195, the contents of the IC card are loaded.

If the A-type flat PAF has not been set, it is checked whether the exposure program of the IC card having inserted at the present time is B-type or not at step #225. If it is B-type, the process proceeds to step #117 without loading the contents of the IC card. If it is not B-type, the process proceeds, after setting the A-type flag PAF, to step #180 to load the contents of the IC card.

If the inserted IC card is the DEMO card, the process proceeds from step #140 to #235 to display a message "P PUSH". Then, DEMO-card flag DEMF is set at step #240 and the terminal CSCAD is made "low-level" to finish the data communication. Thereafter, the process proceeds to step #100 in order to check whether the mode-set OK flag WEDF has been set or not. If it has not been set, the set Ok mode is displayed at step #105.

In the present preferred embodiment, every one of four modes can be set or altered by the insertion of the mode-set alteration card and therefore, four modes are displayed at the same time as shown in FIG. 6 when the card is inserted. However, it is also possible to alter one mode or a few modes by one card. In such a variation case, the way for reading data and the control method for display are shown in FIGS. 7 and 8, respectively.

Figure 7:
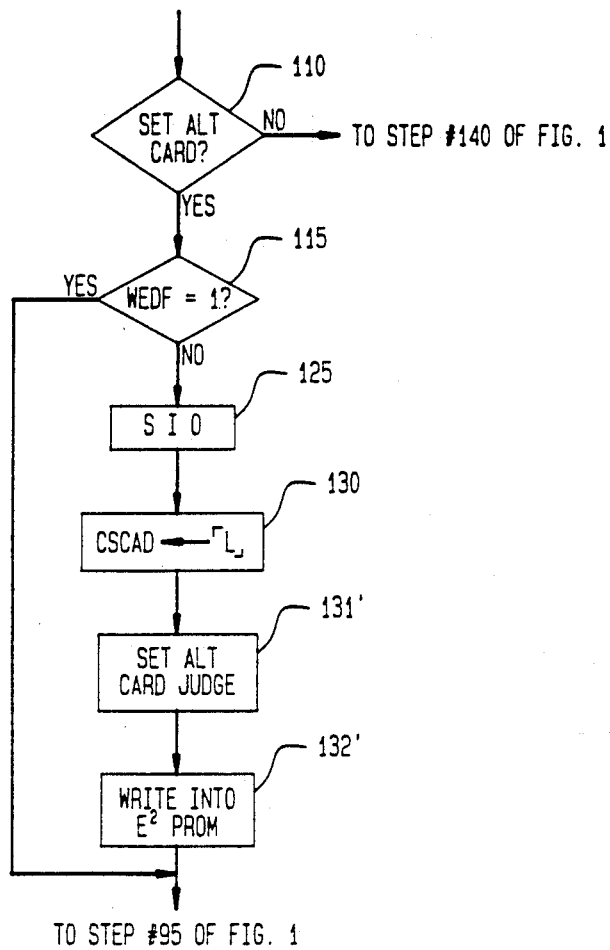
FIGS. 7 and 8 are flow charts showing variations of the flow chart of FIG. 1, respectively.

FIG. 7 shows a variation of steps #115 to #135 of FIG. 1.

At step #125, the serial communication SIO is done and, then, the terminal CSCAD is made "low-level" to finish SIO at step #130. Next, the kind of the mode-set alteration card is determined according to the data entered by the serial communication at step #131' and the data is written into an area of E²PROM assigned therefor. For example, four bits b0 to b3 of one byte data of the IC card are assigned to ISO alteration, AE mode alteration, DRIVE mode alteration and EXPOSURE COMPENSATION alteration, respectively and the micro-computer sets a flag data to one of four bits b0 to b3 at a predetermined address in E²PROM corresponding to the bit having been set which is decided from the data entered.

Figure 8:
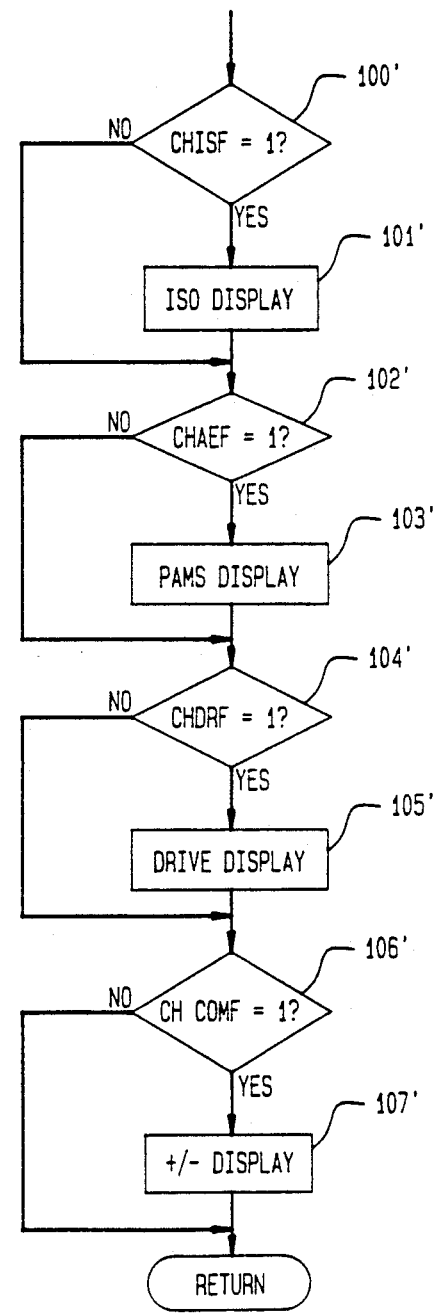

FIG. 8 shows a method how to alter the set OK mode display (see steps #100 and #105) in association with the alteration of the method of the mode-set alteration.

Briefly speaking, according to this method, each mode is determined from each flag data memorized in E²PROM and the determined mode is displayed with use of the corresponding mark shown in FIG. 6. More concretely, if ISO alteration flag CHISF is set at b0 bit, the mark "ISO" (2-1) is displayed (steps #100' and #101'). If it has not been set, it is not displayed of course. Similarly, if AE mode alteration flag CHAEF is set at b1 bit, the mark "PAMS" (2-3) is displayed (steps #102' and #103'), if DRIVE mode alteration flag CHDRF is set at b2 bit, the mark "DRIVE" (2-2) is displayed (steps #104', #105'), and if EXPOSURE COMPENSATION mode flag CHCOMF is set at b3 bit, the mark (+/−) is displayed (steps #106', #107'').

Thus, the subroutine for processing the IC card is completed.

Figure 5:
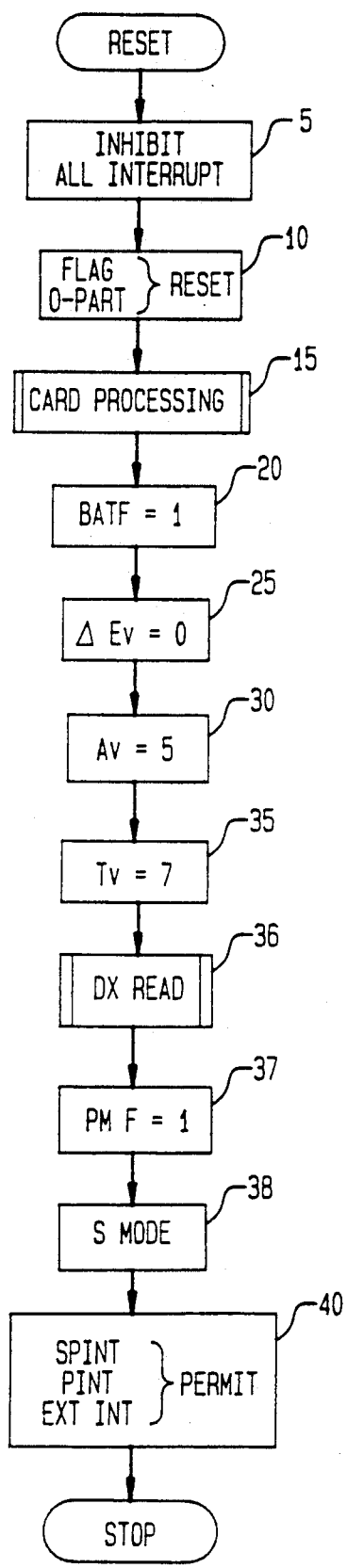
FIG. 5 is a flow chart of a reset routine to be executed by the control system.

Returning to the flow-chart of FIG. 5, when the subroutine for processing the IC card is completed, the micro-computer MC sets the battery flag BATF showing the loading of battery (step #20) and, then, initializes an exposure compensation value ΔEv, a diaphragm aperture value Av and a shutter speed Tv to "0", "5" and "7" in APEX unit, respectively (steps #25, #30 and #35). Then, the process proceeds to a subroutine for reading the sensitivity of a DX-coded film presently having been loaded (step #36).

Figure 9:
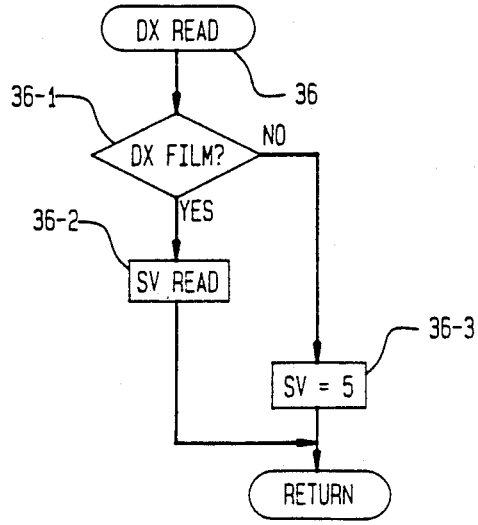
FIG. 9 is a flow chart showing a DX reading subroutine.

The content of this subroutine is shown in FIG. 9. At first, it is checked whether the film has a DX code or not (step #36-1), and, if it is a DX film, the sensitivity Sv of film is read at step #36-2. Then, the process returns.

If the film is not a DX film or any film is not loaded, the film sensitivity Sv is set at "5" (step #36-3) and, then, the process returns to the flow of FIG. 5.

At the next step #37 of the film sensitivity reading subroutine #36, P mode flag PMF is set to set P mode as an AE mode, SINGLE (photo-taking) mode is set as a DRIVE mode at step #38, and, at step #40, all of interruptions SPINT, PINT, EXTINT are permitted. Thus, the initialization is finished.

INTERRUPTION BY SWITCH OPERATION

Figure 10:
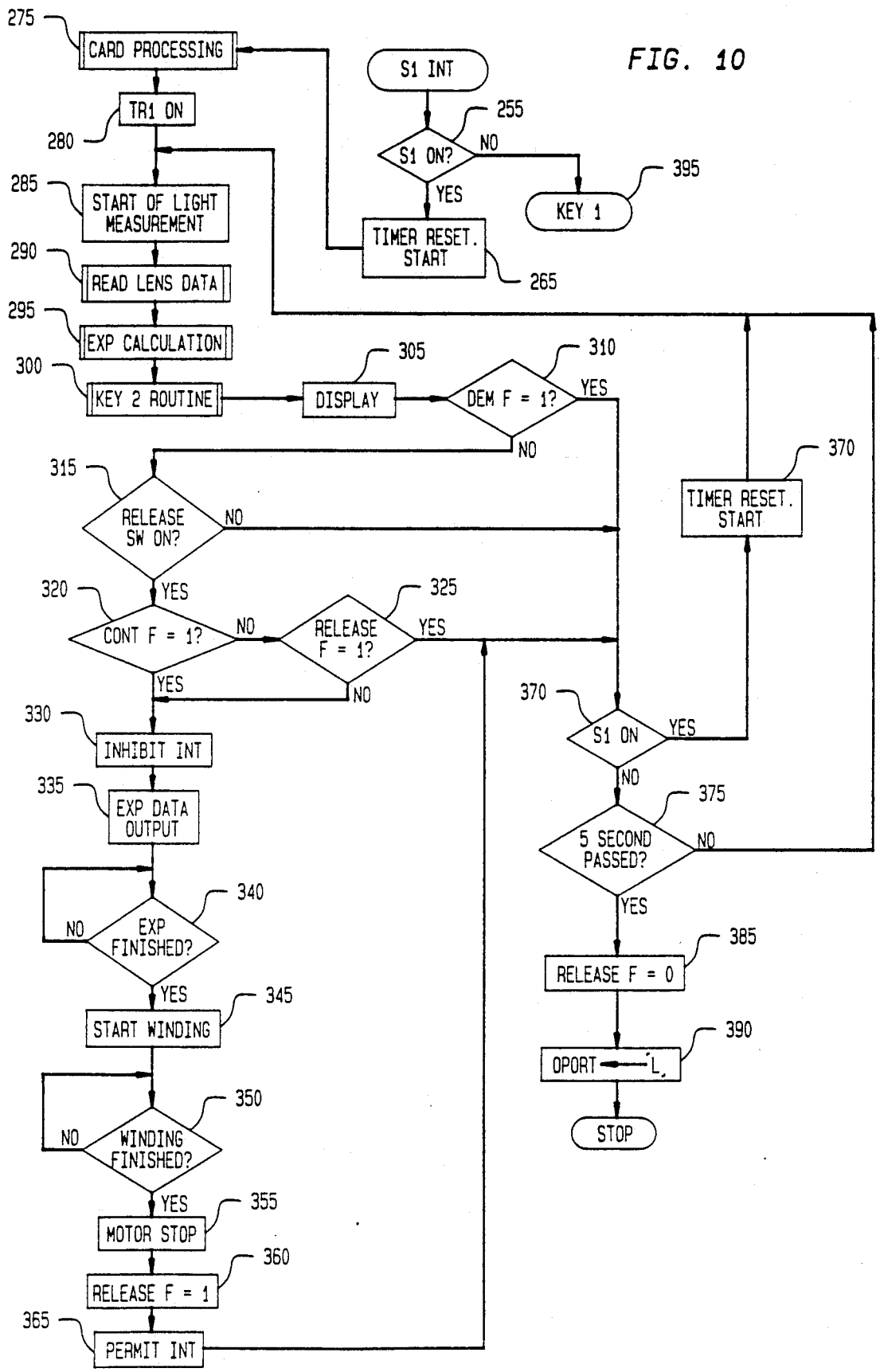
FIG. 10 is a flow chart showing S1INT subroutine according to the present invention.

FIG. 10 shows a flow chart of a control to be executed when the ready switch S1 or either one of the mode-set alteration switches S5 to S8 is switched on.

At first, the micro-computer MC decides whether the present interruption is caused by the ready switch S1 or not (step #255) and, if it is not the case, the process proceeds to Key 1 routine (step #395) since the present interruption is considered to be caused by an operation of either one of the switches S5 to S8.

Figure 11:
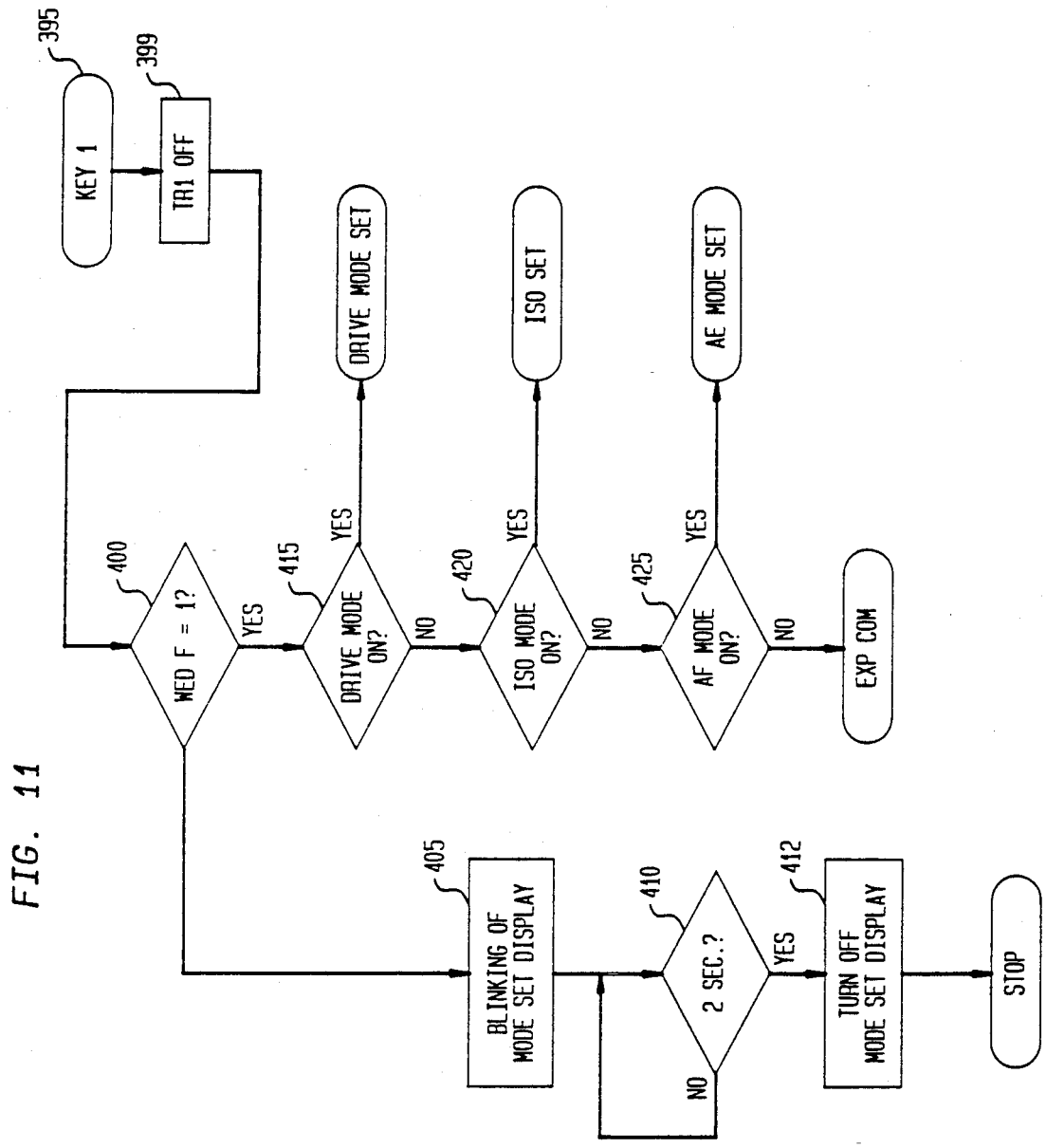
FIG. 11 is a flow chart showing Key 1 routine according to the present invention.

This Key 1 routine is shown in FIG. 11.

The micro-computer turns off the transistor Tr 1 to stop driving of external devices (step #399). Next, it checks Mode-set OK flag WEDF at step #400. If this flag WEDF has not been set, namely if it is impossible to set or alter any mode, all displays shown in FIG. 6 are blinked for 2 seconds (step #405) and, when 2 seconds has passed (step #410), they are turned off (#412).

If the flag WEDF has been set, the process proceeds to either one of DRIVE mode set, ISO SET, AE mode set and EXPOSURE COMPENSATION mode set routines according to either one of the switches S5 to S8 switched on.

Figure 11A:
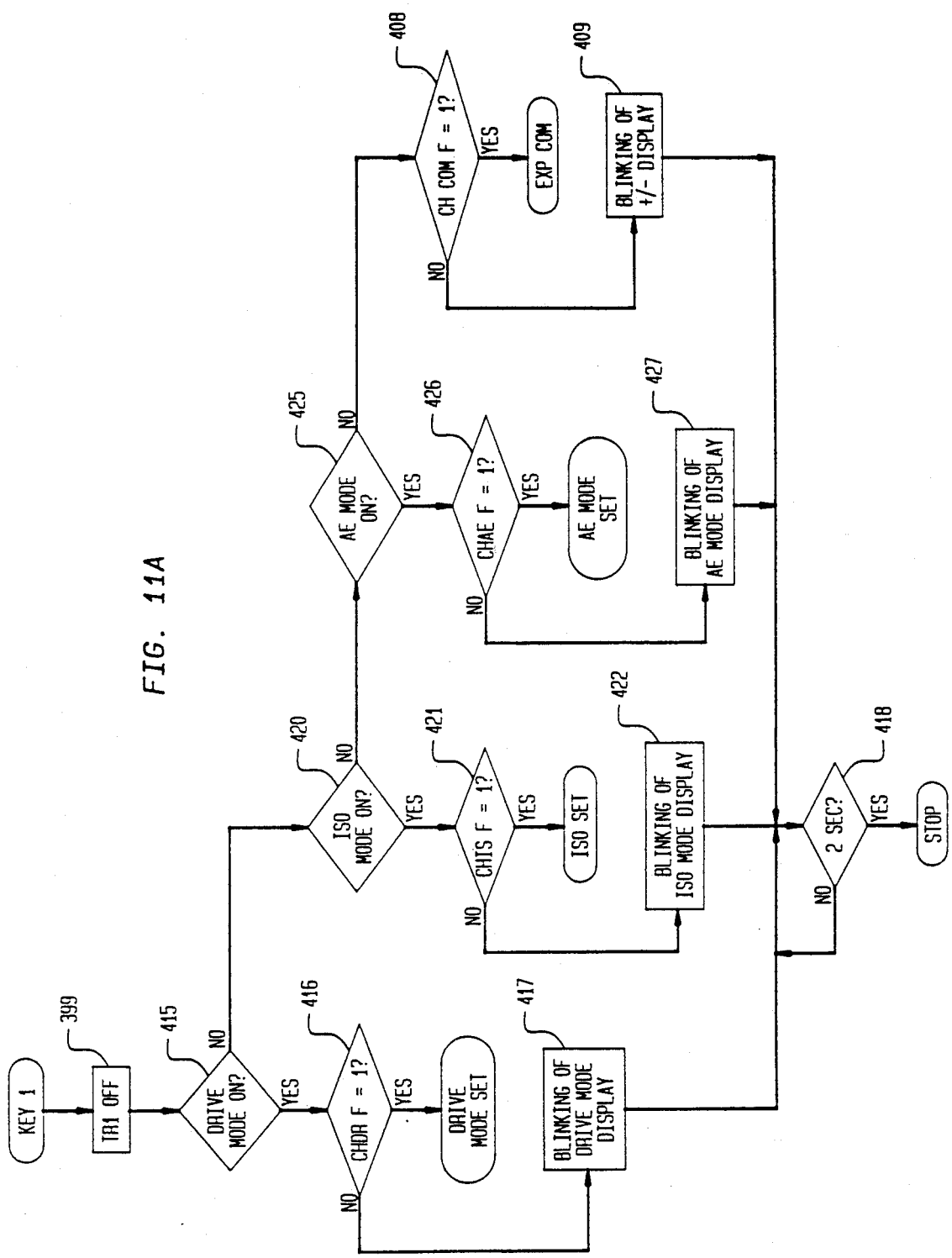
FIG. 11A is a flow chart showing a variation of key 1 routine shown in FIG. 11.

Next, the variation wherein one IC card has one or a few alteration functions will be explained referring to FIG. 11A.

As is apparent from the comparison with FIG. 11, after either one of four modes is selected, it is checked whether the corresponding flag (CHDRF, CHISF, CHAEF or CHCOMF) which shows that the mode can be set or altered has been set or not (steps #416, #421, #426, #408), and, if it has been set, the process proceeds to each mode setting subroutine similarly to FIG. 11. If it has not been set, the corresponding display, for example, "ISO" in ISO set mode, is blinked for 2 seconds and then stopped (steps #417, #422, #427, #409, #418).

In the variation, the flow-charts of FIG. 7 and FIG. 8 are used for processing the IC card.

Before starting the explanation of each mode setting routine, the content of the photo-taking information display device 1 formed with the liquid crystal device will be explained.

Figure 12:
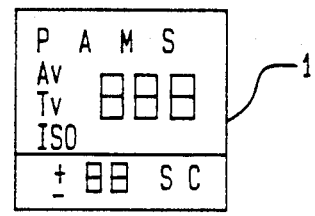
FIG. 12 is a plan-view showing a display device according to the present invention.

FIG. 12 shows the full lighting state of the device. Characters "P", "A", "M" and "S" denote A, P, M and S modes in AE mode, respectively. Symbols "Av", "Tv" and "ISO" denote the diaphragm aperture, the shutter speed and the sensitivity of film, respectively and individual values are commonly indicated right-hand portions of them in four numerical figures. Among marks indicated in the lower portion of the display, two numerical figures and negative mark denote an amount of exposure compensation and "S" denotes SINGLE SHOT mode in a DRIVE mode and "C" denotes CONTINUOUS SHOT mode in a DRIVE mode.

MODE SET ALTERATION routine (A) DRIVE MODE SETTING

Figure 13:
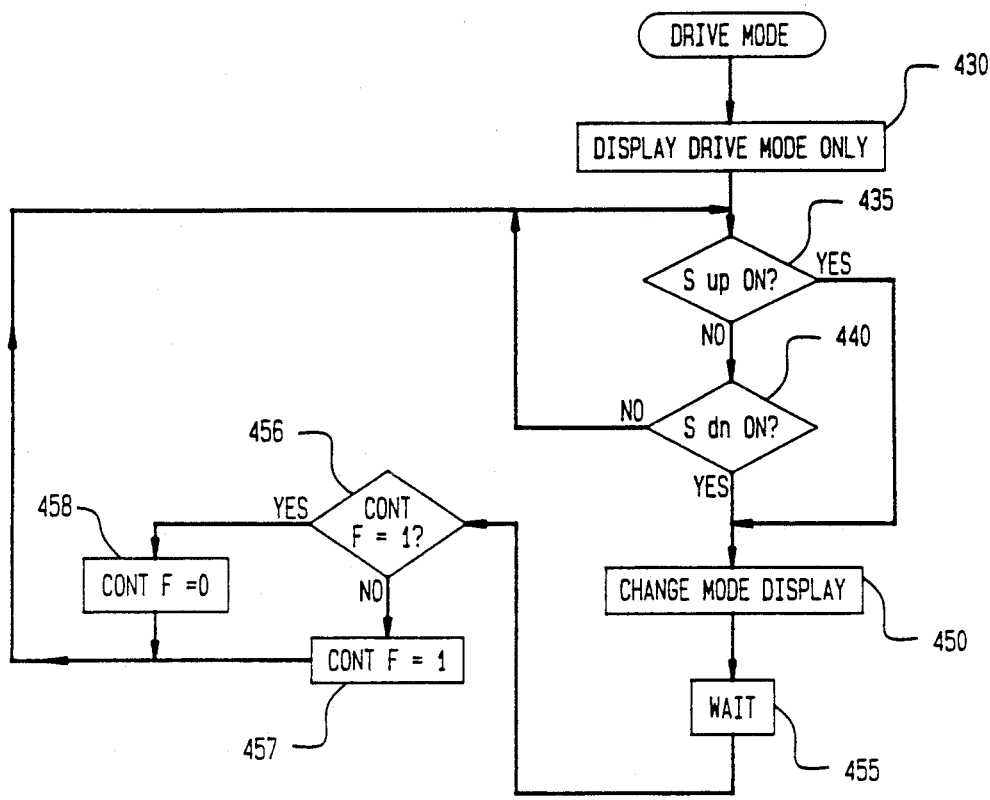
FIGS. 13, 14, 15 and 16 are flow charts showing DRIVE mode, ISO setting mode, AE mode, ±CORRECTION mode, respectively.

A DRIVE mode routine is shown in FIG. 13. When this routine is started, the micro-computer MC displays either one of DRIVE mode "S" or "C" being selected at that time (#430). Then, it checks whether the up-switch Sup or the down switch Sdn is switched on at step #435 or #440, respectively and, if either one is switched on, the process proceeds to step #450. At step #450, the DRIVE mode display is changed to the other (from "S" to "C" or from "C" to "S") and the process waits for a short time, for example 500 m sec., in order to prevent successive change (step #455).

Next, the CONT flag which denotes CONTINUOUS SHOT mode is checked at step #456 and, if it has been set, it is reset at step #457. If it has not been set, it is set at step #458. Then, the process returns to step #435.

When neither of switches Sup and Sdn are depressed, steps #435 and #440 are repeated.

(B) ISO SETTING

Figure 14:
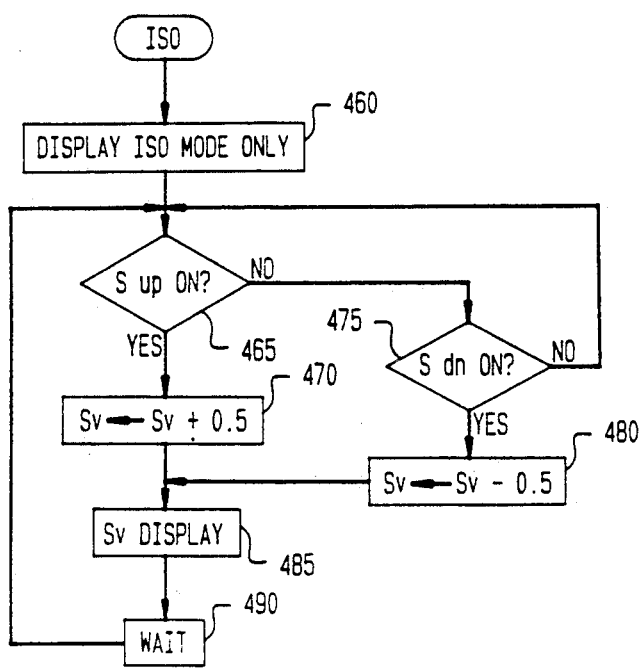

ISO setting routine is shown in FIG. 14. The micro-computer displays "ISO", the film sensitivity value (ISO value) in four numerical figures (#460). When the up-switch Sup is depressed (step #465), "0.5 in APEX unit is added to the present value $S_v$(step #470). When the down-switch Sdn is depressed (step #475), "0.5" in APEX unit is subtracted from the present value $S_v$. The resulted value is transformed into an ISO value which in turn is indicated at step #485.

Similarly to the DRIVE mode, the process waits for a short time at step #490 and, then, returns to step #465. If neither of switches Sup and Sdn are depressed, steps #465 and #475 are repeated.

(C) AE MODE SETTING

Figure 15:
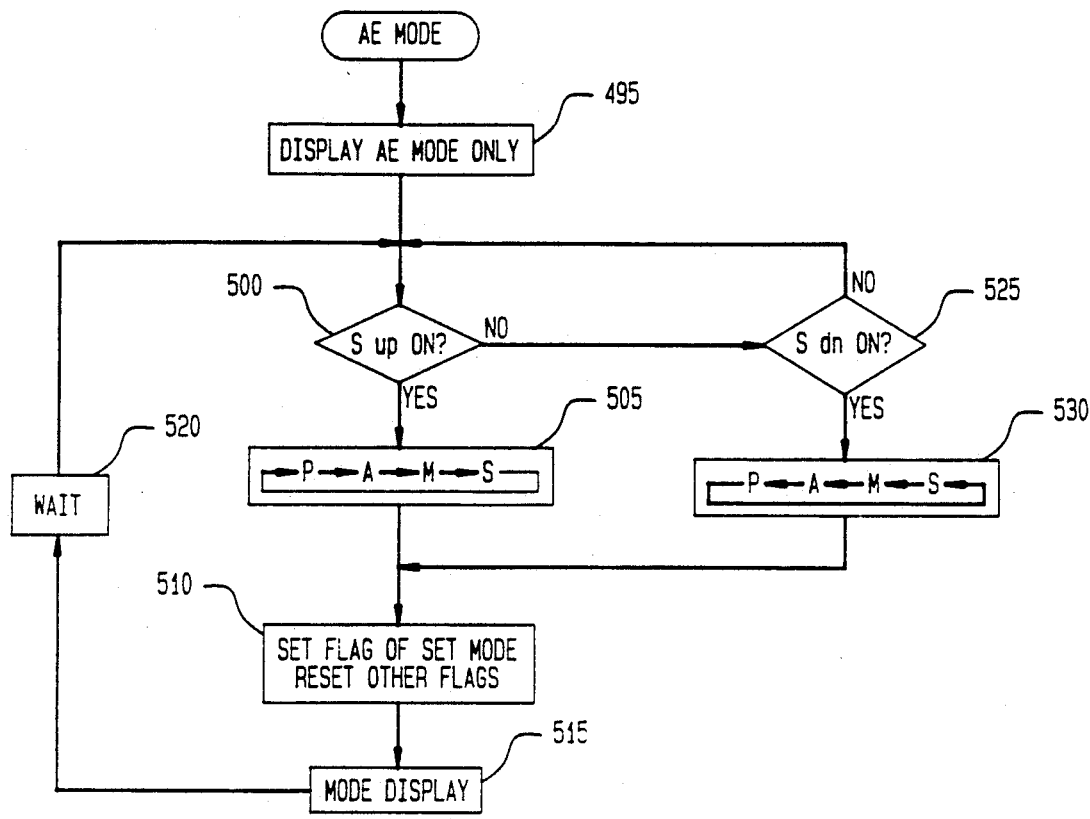

AE mode setting routine is shown in FIG. 15.

When this routine is started, the micro-computer MC displays only the present AE mode among "P", "A", "M" and "S" (step #495). When the up-switch Sup is kept depressed, the display is forwarded successively in a cyclic manner such as "P"→"A"→"M"→"S" (step #505). On the contrary to the above, if the down-switch Sdn is kept depressed, the display is changed in a reverse direction such as "P"→"S"→"M"→"A"→"P" (step #530).

If an alteration of mode is made, the flag of the set mode, concretely, the flag PMF in P mode, the flag AMF in A mode, the flag MMF in M mode or the flag SMF in S mode is set and other flags are reset at step #510 and, then, the mode having been altered is displayed at step #515. The process waits for a short time at step #520 and returns to step #500. If neither of switches Sup and Sdn are switched on, steps #500 and #525 are repeated.

(D) EXPOSURE COMPENSATION MODE

Figure 16:
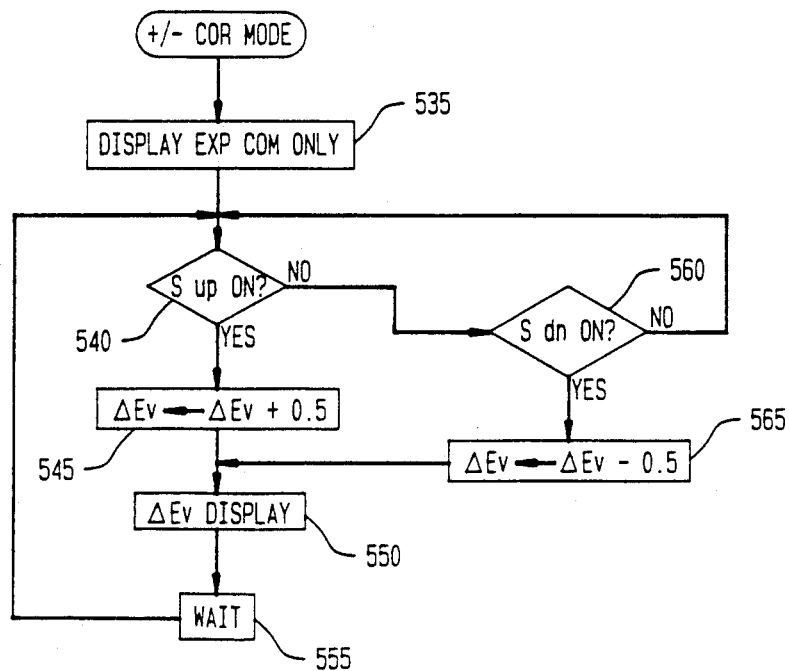

EXPOSURE COMPENSATION routine is shown in FIG. 16.

The micro-computer displays only the present amount ΔEv of exposure compensation, for example "+0.5" (step #535). When the up-switch Sup is switched on (step #540), 0.5 is added to the present amount ΔEv (step #545) and, if the down-switch Sdn is switched on (step #560), 0.5 is subtracted from ΔEv. The resulted value ΔEv is displayed together with a sign + or − (step #550). Then, the process waits for a short time (step #555) and returns to step #540. Neither of switches Sup and Sdn are switched on, steps #540 and #560 are repeated.

In order to slip out of one routine mentioned above, the operator has to operate the ready switch S1, to insert or extract the IC card, to close the back lid or to set another mode.

In another way, an internal timer is provided for counting up a suitable time interval, for example, ten seconds. If neither of switches Sup and Sdn is switched on within the time interval, this routine is stopped.

PROCESSING regarding READY SWITCH

Returning to FIG. 10, when the ready switch S1 is switched on (step #255), the process proceeds to step #265 to start a timer for holding the power supply after resetting it.

Next, the process proceeds to the subroutine for processing the IC card to read the information thereof (step #275) and to turn on the power transistor Tr1 (step #280). The method for reading the information of the IC card has been already explained referring to FIG. 1.

Then, the micro-computer MC outputs a signal for starting a light measurement to the light measuring circuit (see LM of FIG. 4) and goes to a subroutine #290 in order to access data intrinsic to an objective lens mounted.

(A) READING LENS DATA

Figure 17:
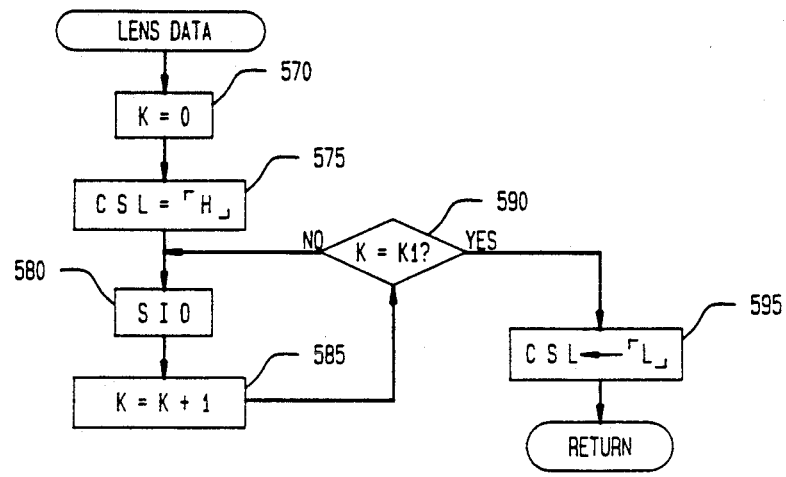
FIG. 17 is a flow chart of a lens-data reading subroutine.

LENS DATA READING subroutine is shown in FIG. 17.

The micro-computer sets a variable K at zero (step #5700) and makes a terminal CSL "high-level" (step #575). Due to this, two AND gates AN3 and AN4 (see FIG. 4) are made enable. Next, the micro-computer executes a serial communication between the objective lens LE (step #580) and increments K by one. The serial communication is repeated until K becomes a predetermined integer K1 (steps #585, #590). When the number K of times of communications becomes equal to K1, the micro-computer MC makes the terminal CSL "low-level" in order to return (#595). Lens data to be obtained from the objective lens LE are an open F-value Avo and the maximum diaphragm aperture value Avmax.

(B) EXPOSURE CALCULATION

Figure 18:
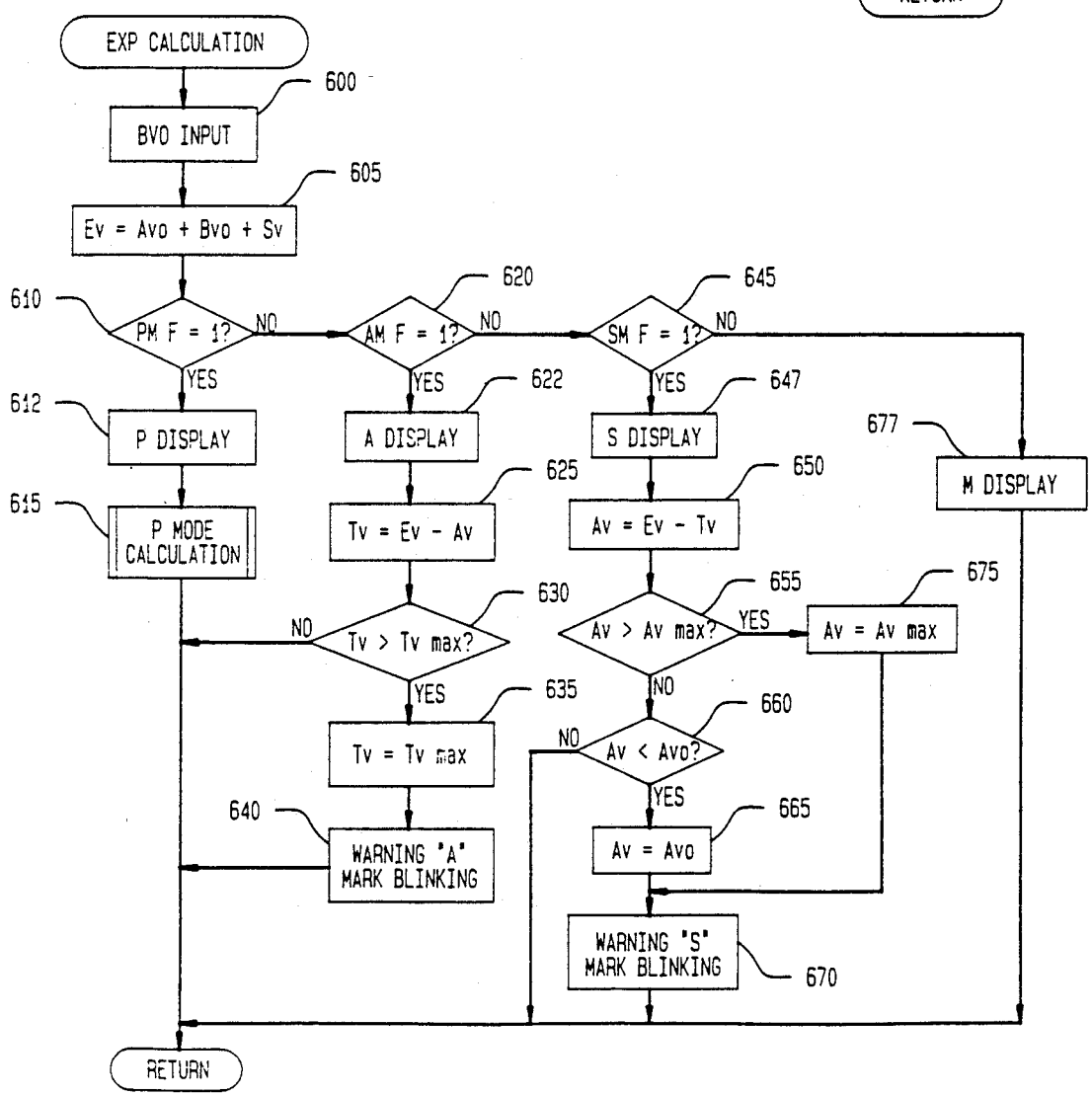
FIG. 18 is a flow chart of a subroutine for calculating exposure data.

Next, the process proceeds to a subroutine #295 for calculating exposure data. This subroutine is shown in FIG. 18.

The micro-computer MC inputs an open-measured light value Bvo (=Bv−Avo) from the light measuring circuit LM (step #600) and calculates an exposure value Ev from the following equation Ev=Bvo+Avo+Sv (step #605). Then, the kind of an exposure control mode is decided according to a flag having been set. If P mode flag PMF has been set (step #610), only "P" is displayed among AE mode indications "P, A, M, S" (step #612) and, then, the process proceeds to a subroutine #615 for P-mode calculation (the content thereof is memorized in the RAMP) and returns after executing the subroutine.

In the present preferred embodiment, there are provided three P-mode programs as follows:

normal program PN having been stored in the camera as a standard one from the first, a program PA having been stored in an IC card which is intended to have a shallow depth of field for photo-taking a portrait or a static object, and a program PB having been stored also in an IC card which is intended to have a depth of field as deep as possible for photo-taking (in this case, the shutter speed is given the top priority in order to avoid a hand shake).

Either one of these three programs is stored in the area RAMP of E$^2$PROM. Programmed diagrams of them are shown in FIG. 19. These programmed diagrams are given for an objective lens having an open F-value of 1.4 and maximum F-value of 16.

Figure 20C:
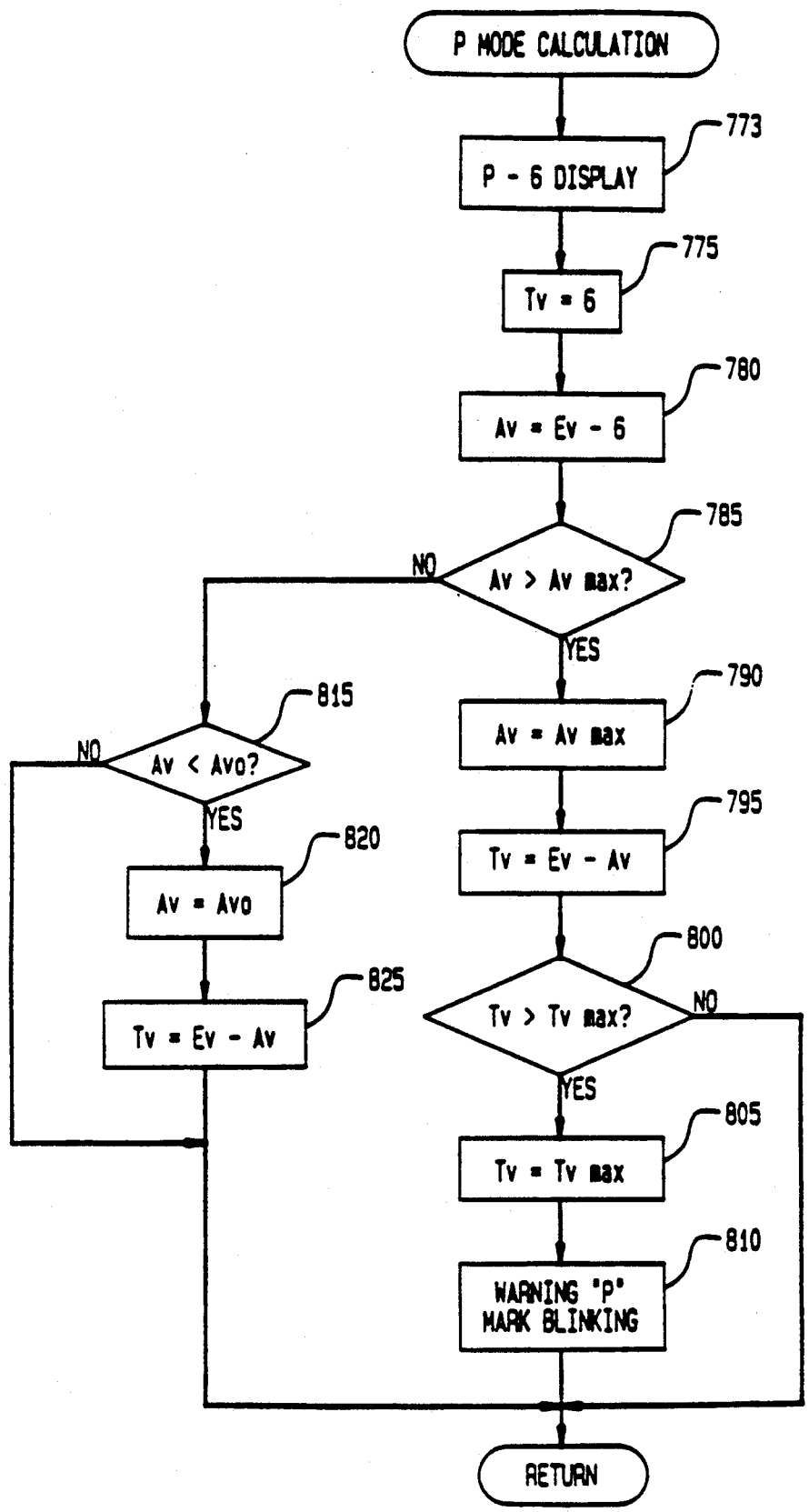

Flow-charts for executing programmed diagrams are shown in FIGS. 20A, 20B, and 20C, respectively.

(B-1) NORMAL PROGRAM PN

Referring to FIG. 20-A, the exposure calculation by the normal program PN will be explained at first.

At step #679, the micro-computer MC indicates "P" at the most left-hand side position of the 7-segments numerical display of the display device 1 (see FIG. 12). Then, a diaphragm aperture value Av is calculated from the following equation $Av=(\frac{2}{3})(Ev-11/2)$ at step #680 and Av is compared with the maximum diaphragm aperture value Avmax of the objective lens at step #685. If Av is larger than Avmax, Av is made equal to Avmax (step #690). On the contrary, if Av is smaller than the open F-value Avo, Av is made equal to Avo at step #720. If Av falls between Avo and Avmax (Avo<Av<Avmax), the calculated value is set as Av and the process proceeds to step #695 in order to calculate a shutter speed Tv. This calculation is carried out with an equation Tv=Ev−Av. Tv obtained is compared with the maximum shutter speed Tvmax of the camera at step #700 and, if it is faster than Tvmax, the value of Tv is made equal to Tvmax at step #705 and a warning is made by blinking "P" mark at step #710. Then, the process returns to the main flow. If Tv is not faster than Tvmax, the process returns skipping steps #705 and #710.

(B-2) PA Program

Next, a subroutine for calculating an exposure value according to the PA program having a shallow depth of field is shown in FIG. 20B. The micro-computer displays "P-A" with use of three left hand-side positions of the segment numerical display at step #722. It is decided whether the open F-value Avo is smaller than "3" at step #725 and, if it is so, it is made equal to "3" at step #735. If it is larger than "3", the diaphragm aperture value Av is set equal to the open F-value at step #730 and a shutter speed Tv is calculated by an equation Tv=Ev=Av at step #740. The shutter speed Tv is compared with the maximum shutter speed Tvmax at step #745 and, if it is not faster than the maximum shutter speed, the process returns directly. If it exceeds Tvmax, it is made equal to the latter at step #750 and the diaphragm aperture value Av is recalculated by the equation Av=Ev−Tv at step #755. Then, it is decided whether the diaphragm aperture value Av is larger than the maximum diaphragm aperture value Avmax at step #760 and, if it is not larger than Avmax, the process returns to the main flow. If it is larger than Avmax, Av is set equal to Avmax at step #765 and a warning is made by blinking "P" mark at step #770. Then, the process returns to the main flow.

(B-3) PB PROGRAM

A flow chart of the PB program is shown in FIG. 20C.

At first, an indication "P-b" is displayed with use of the left-hand three positions of the segment numeric display at step #773. Then, the shutter speed Tv is set equal to "6" at step #775 and the diaphragm aperture value Av is calculated by an equation $Av=Ev-6$ at step #780. Then, the diaphragm aperture value obtained is compared with the maximum diaphragm aperture value Avmax at step #785 and, if it does not exceed the latter, the process proceeds to step #815 to compare it with the open diaphragm aperture value Avo. If it is not smaller than the latter, the process returns to the main routine and, if it is smaller than the latter, the diaphragm aperture value Av is set equal to the open diaphragm value Avo at step #820. Then, the shutter speed Tv is calculated from an equation $Tv=Ev-Av$ and the process returns to the main flow (at step #825).

If the diaphragm aperture value Av exceeds the maximum value Avmax, the former is set equal to Avmax at step #790 and the shutter speed Tv is calculated by an equation $Tv=Ev-Av$ at step #795. Then, the calculated shutter speed Tv is compared with the maximum shutter speed Tvmax at sep #800 and, if it does not exceed the latter, the process returns to the main flow. If it exceeds the latter, the shutter speed is set equal to Tvmax at step #805 and a warning is made by blinking "P" mark at step #810. Then, the process returns to the main flow.

(B-4) A-MODE

Returning to FIG. 18, if A-mode is designated, the process proceeds from step #620 to step #622. At step #622, only "A" mark is displayed among "P, A, M, S" and a shutter speed Tv is calculated by an equation $Tv=Ev-Av$ (Av is set predeterminedly). At step #630, it is decided whether the calculated shutter speed Tv exceeds the maximum shutter speed Tvmax. If it exceeds Tvmax, it is set equal to Tvmax at step #635 and "A" mark is blinked for warning at step #640. Then, the process returns to the main flow. If it does not exceed, the process returns to the main flow directly.

(B-5) S-MODE

If the AE mode is S-mode, the process proceeds from step #645 to step #647 to display only "S" mark among "P, A, M, S" and then, the diaphragm aperture value Av is calculated by an equation $Av=Ev-Tv$ (Tv is set predeterminedly) at step #650. At step #655, the diaphragm aperture value Av is compared with the maximum diaphragm aperture value Avmax and, if it is larger than the latter, it is set equal to Avmax at step #675. Then, "S" mark is blinked for warning and the process returns to the main flow thereafter. If it is not larger than Avmax, it is compared with the open diaphragm aperture value Avo at step #660 and, if it is not smaller than Avo, the process returns to the main flow directly. If it is smaller than Avo, it is set equal to Avo at step #665 and "S" mark is blinked for warning and, thereafter, the process returns to the main flow at step #670.

(B-6) M-MODE

When M-mode is designated, the process proceeds from step #645 to step #677 and only "M" mark is displayed among "P, A, M, S". The process returns to the main flow thereafter.

(C) Key 2 routine for changing both of the diaphragm aperture value and the shutter speed Returning to FIG. 10, when the exposure calculation subroutine has been finished, the process proceeds to Key 2 routine at step #300 for changing the diaphragm aperture value and the shutter speed by operating either of the up-switch Sup and the down switch Sdn.

A flow thereof is shown in FIG. 21. According to this routine, it is checked whether the up-switch Sup is switched on or not at step #820 and, if it is switched on, an up-flag UPF is set at step #825. On the contrary to the above, it is checked whether the down-switch Sdn is switched on at step #830. If it is switched on, the up-flag UPF is reset at step #835 and, then, the process proceeds to step #840. If neither of these switches are not switched on, the process returns. Through steps #840 to #870, the diaphragm aperture value and/or the shutter speed can be changed.

When P-mode is selected, the process proceeds from step #840 to step #845 in order to execute a subroutine for Program-shift.

When A-mode is selected, the process proceeds from step #850 to step #855 to execute a subroutine for altering the diaphragm aperture value.

When S-mode is selected, the process proceeds from step #860 to step #865 in order to execute a subroutine for altering the shutter speed.

Figure 22:
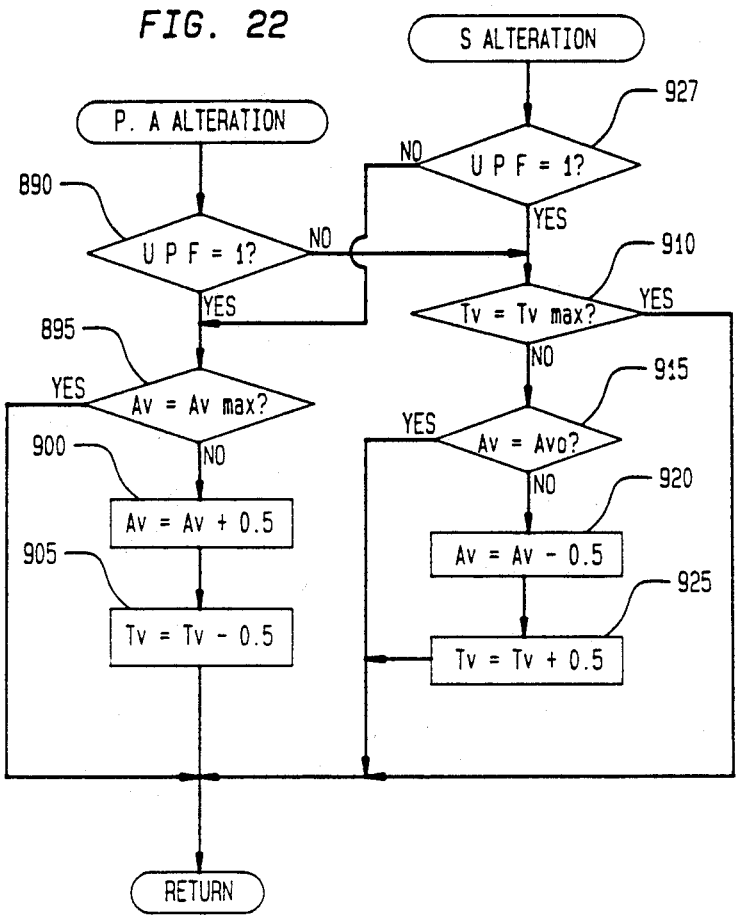
FIG. 22 is a flow chart showing P-, A-, and S-alteration routines in FIG. 21.

These three subroutines are shown in FIG. 22.

As shown in FIG. 22, the subroutine for P-mode (program shift) and that for A-mode are identical to each other. At first, it is checked whether the up-flag UPF showing that the up-switch is switched on has been set or not at step #890. If it has been set, the process proceeds to step #895 to decide whether the diaphragm aperture value Av is equal to Avmax. If it is equal to the latter, the process returns without alteration thereof since it is impossible to alter Av. If it is not equal to Avmax, "0.5" is added to Av at step #900 and "0.5" is subtracted from Tv and these values are set as values to be used actually.

On the contrary to the above, in the case that the up-flag UPF is not set, the down-switch Sdn is considered to be switched on, the process proceeds to step #910 in order to decide whether the shutter speed Tv is equal to the maximum shutter speed Tvmax. If it is equal to Tvmax, the process returns since it is impossible to change the shutter speed. If the shutter speed Tv is not equal to Tvmax, it is checked whether the diaphragm aperture value Av is equal to the open-diaphragm aperture value Avo at step #915. If it is equal to Avo, the process returns as it is impossible to change the diaphragm value.

If it is not equal to Avo, "0.5" is subtracted from the diaphragm aperture value Av at step #920 and "0.5" is added to the shutter speed Tv at step #925 and, then, these values obtained are set as actual values to be used.

In the S-mode for changing the shutter speed, the up-flag UPF is checked at first which shows that the up-switch is switched on. If it has been set, the process proceeds to a flow for adding 0.5 to the shutter speed Tv which begins from step #910. If it has not been set, the process proceeds to a flow for subtracting 0.5 from the shutter speed Tv which begins from step #895.

Figure 23:
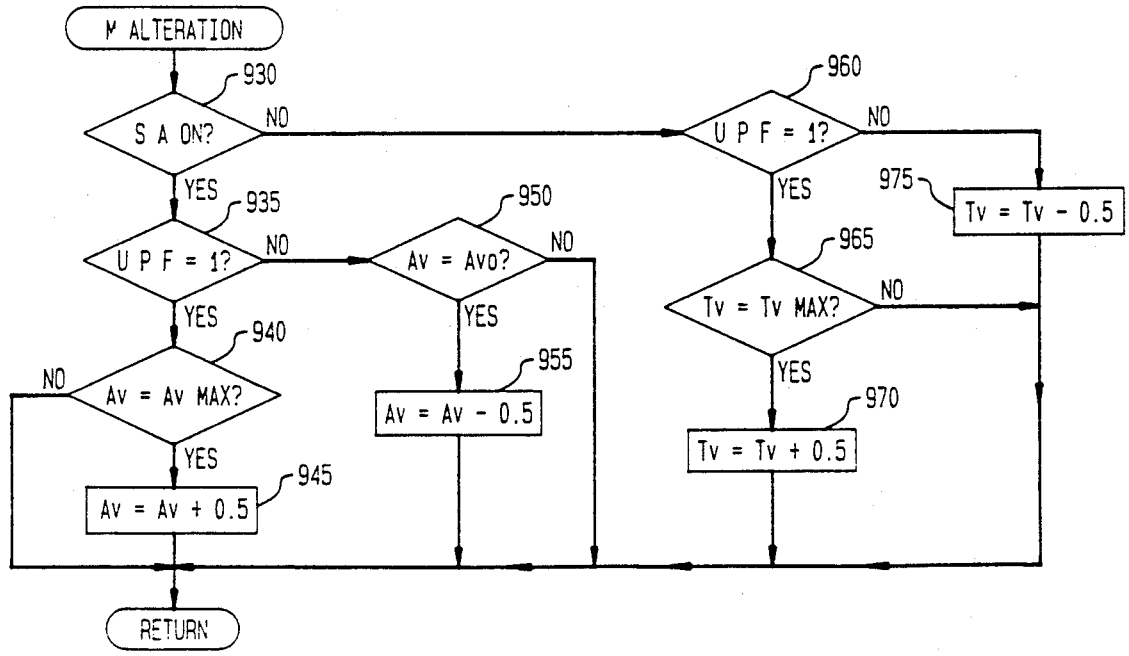
FIG. 23 is a flow chart of M-alteration subroutine.

In the flow of FIG. 21, if neither of these modes mentioned above are not selected, the M mode is considered to be selected. Accordingly, the process proceeds to a subroutine #870 for the manual mode. FIG. 23 shows the subroutine thereof.

As shown in FIG. 23, in this routine, it is decided at step #930 which is selected between the diaphragm alteration and the shutter speed alteration according to information that the exposure alteration switch SA (see FIG. 4) is switched on or not. In the case of the diaphragm alteration, the process proceeds to step #935 to check whether the up-flag UPF has been set or not. If it has been set, namely the up-switch is operated, the process proceeds to step #940 in order to decide whether the diaphragm aperture value is equal to Avmax or not. If it is equal to Avmax, the process returns without altering Av. If it is not equal to Avmax, "0.5" is added to the diaphragm aperture value Av at step #945 and, then, the process returns to the main routine.

If the up-flag UPF has not been set, the process proceeds to step #950 as the down-switch Sdn is considered to be switched on and it is decided whether the diaphragm aperture value is equal to the open diaphragm aperture value Avo. If it is equal to Avo, the process returns to the main flow. If it is not equal to Avo, "0.5" is subtracted from the diaphragm aperture value Av at step #955 and, then, the process returns to the main flow.

If the diaphragm alteration switch SA is not operated, the process proceeds to step #960 in order to execute a subroutine for altering the shutter speed. At this step, it is checked whether the up-flag UPF has been set of not and, if it has been set, the process proceeds to step #965 as the up-switch Sup is switched on. At this step, it is checked whether the shutter speed Tv is equal to Tvmax and, if it is equal to Tvmax, the process returns without altering the shutter speed Tv. If it is not equal to Tvmax, "0.5" is added to the shutter speed Tv at step #970 and, thereafter, the process returns. If the up-flag UPF has not been set, "0.5" is subtracted from the shutter speed Tv and, thereafter, the process returns.

Returning now to FIG. 21, when the diaphragm aperture value and/or the shutter speed have been altered in either one of AE modes, the process proceeds to step #880 to wait for a short time in order to prevent a successive alteration and a timer for time-holding is reset and started to count 5 seconds. Thus, Key 2 subroutine has been finished.

(D) PHOTO-TAKING DISPLAY

When Key 2 subroutine has been finished, the process returns to the flow chart of FIG. 10.

The micro-computer MC displays a F-value and "Av" mark in A-mode, with use of Av, Tv and the segment display and, in S-mode, displays an actual shutter speed (for example, (1/60)sec.) and "Tv" mark. In other exposure modes, nothing is displayed (However, in the view-finder (not shown) of the camera, the present shutter speed and diaphragm aperture value are indicated.). Indications of an exposure compensation amount ΔEv, "AE" mode and "DRIVE" mode other than indications mentioned above are displayed at step #305.

Then, it is checked, at step #310, whether the DEMO-flag DEMF has been set or not, which indicates that the DEMO card has been inserted.

If it has been set, a release operation is inhibited and the process proceeds to step #370. At step #370, it is decided whether the ready switch S1 is switched on and, if it is switched on, an internal timer is reset and started to count a predetermined hold-time (for example, 5 seconds). Then, the process returns to step #285. If the hold-time has passed, the release flag is reset and the output port is made "low-level" to stop at steps #385 and #390.

If it is decided, at step #310, that the DEMO flag DEMF has not been set, it is decided according to a level of an input-port IP11 whether the release switch S2 is switched on or not. If the input-port IP11 is set at "high-level", the process proceeds to step #370 as the release switch S2 is kept OFF. If the input-port IP11 is set at "low-level", the process proceeds to step #320 in order to check whether the CONT flag showing the continuous shot mode has been set or not. It is has been set, the process proceeds to step #330 in order to carry out a release operation. If the CONT flag has not been set, namely the single shot mode is selected, the release flag is checked to decide whether a release operation has been done while the release switch S1 is kept ON (step #325).

If the release flag has been set, since the release operation is considered to have been carried out once in the single shot mode, the process proceeds to step #370 in order to inhibit a further release operation.

If the release flag has not been set, the process proceeds to step #330 to carry out a release operation.

The micro-computer inhibits all interruptions into this flow and, then, outputs exposure data Tv and Av to the exposure control circuit AE. The exposure control circuit AE controls stopping-down of the diaphragm aperture, the moving-up of the mirror and traveling of the shutter sequentially to carry out release operation from the timing at that the data are input.

When the second shutter of the focal-plane-shutter has finished a running thereof, the switch S3 is switched on. The micro-computer MC detects it from a level of an input port IP10 at step #340 and, then, outputs a starting signal for winding up the film to the motor control circuit MD at step #345. When the micro-computer MC detects that the switch S4 is switched on at step #350, it outputs a stop signal to the motor control circuit MD at step #355, sets the release flag at step #360, permits all interruptions and, then, proceeds to step #370.

(E) EXTERNAL INTERRUPTION

Next, an external interruption to be executed upon inserting an IC card, extracting the same or closing the back lid will be explained referring to FIG. 24.

The external interruption by closing the back lid will be explained at first.

When the switch SBK for detecting a closure of the back lid is switched on, a pulse is outputted from the one shot circuit OS1 (see FIG. 4) and it is input, via the OR gate OR1, into the EXTINT port. The micro-computer MC executes the external interruption due to the input pulse.

At the same time, the RS-flip-flop RSFF is set by the pulse.

Figure 24:
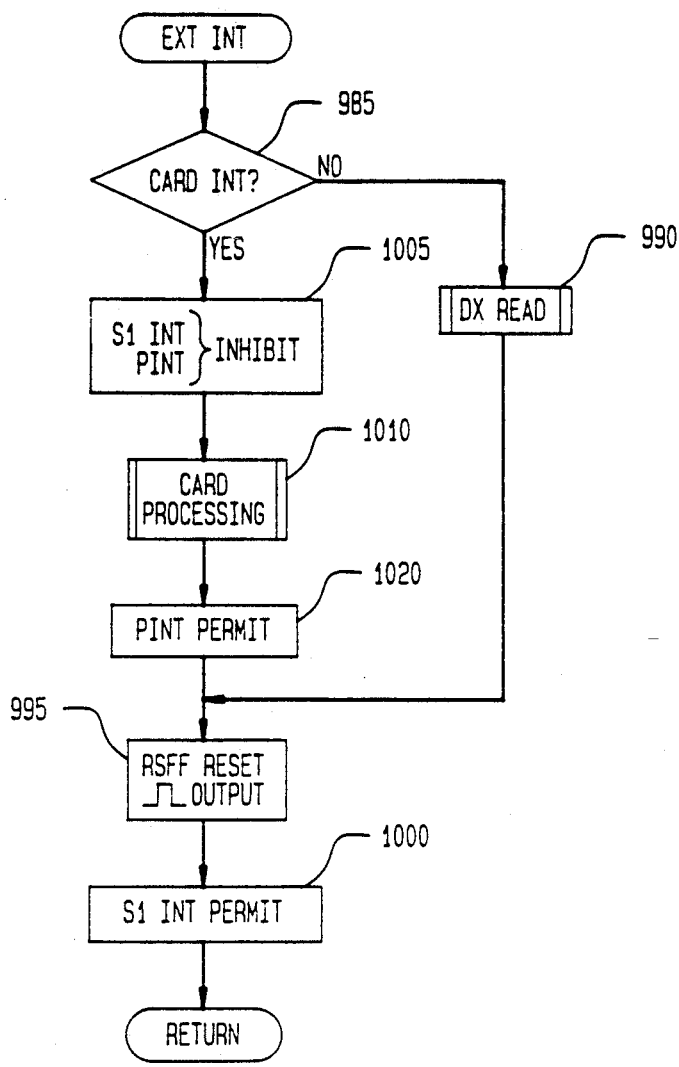
FIGS. 24 and 25 are flow charts showing interruption routines EXTINT and PINT, respectively.

In the flow chart of FIG. 24, the micro-computer decides whether the interruption is caused by the insertion of an IC card or the extraction of the same according to a level of the input port IP5 at step #985. In the present case, since the input port IP5 is kept at "high-level", the process proceeds to step #990 in order to execute a subroutine for reading ISO information of a DX film having been explained in FIG. 9.

Then, one pulse is outputted from the output port OP1 in order to reset the RS flip-flop at step #995 and the process returns after permitting the interruption by the ready switch S1 at step #1000.

When an interruption is caused by the insertion or extraction of an IC card, a pulse from the second one shot circuit OS2 is input, via the OR gate OR1, to the EXT-INT port and the micro-computer MC executes the EXTINT interruption. The process proceeds from step #985 to step #1005 and, at step #1005, inhibits both interruptions of S1 INT and PINT to execute the subroutine for processing IC card as explained in FIG. 1. After reading the information of the IC card, the micro-computer MC permits PINT at step #1020 and, then, proceeds to step #995.

Figure 25:
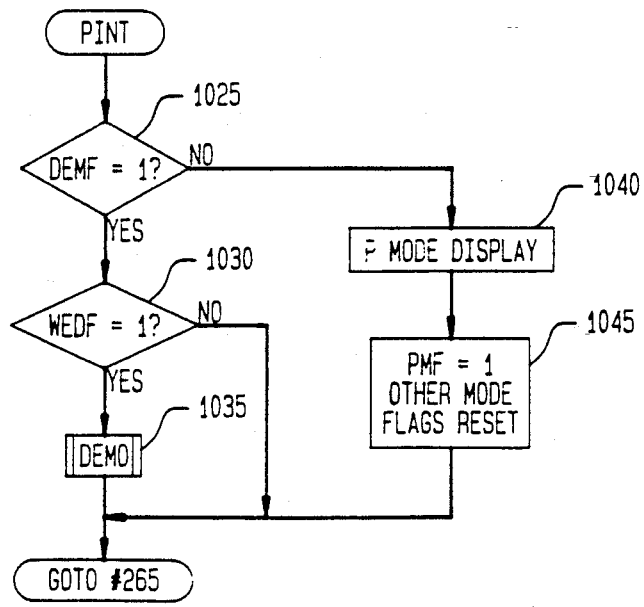

Next, an interruption to be executed when the program switch is switched on will be explained referring to FIG. 25. At first, the micro-computer MC checks the DEMO flag DEMF indicating the insertion of an IC card at step #1025. If it has not been set, the process proceeds to step #1040 since P-mode is considered to be chosen directly. At step #1040, only "P" mark is indicated among "P, A, M, S" and the P-mode flag PMF is set and other AE mode flags are reset at step #1045.

When, the DEMO flag has been set at step #1025, the SET ALTERATION OK flag WEDF is checked. If it has been set, the process proceeds to a DEMO subroutine which will be explained hereinafter and proceeds to step #265 after completing the DEMO subroutine. If it has not been set, the process proceeds to step #265 skipping step #1035.

(F) DEMO subroutine

Figure 26:
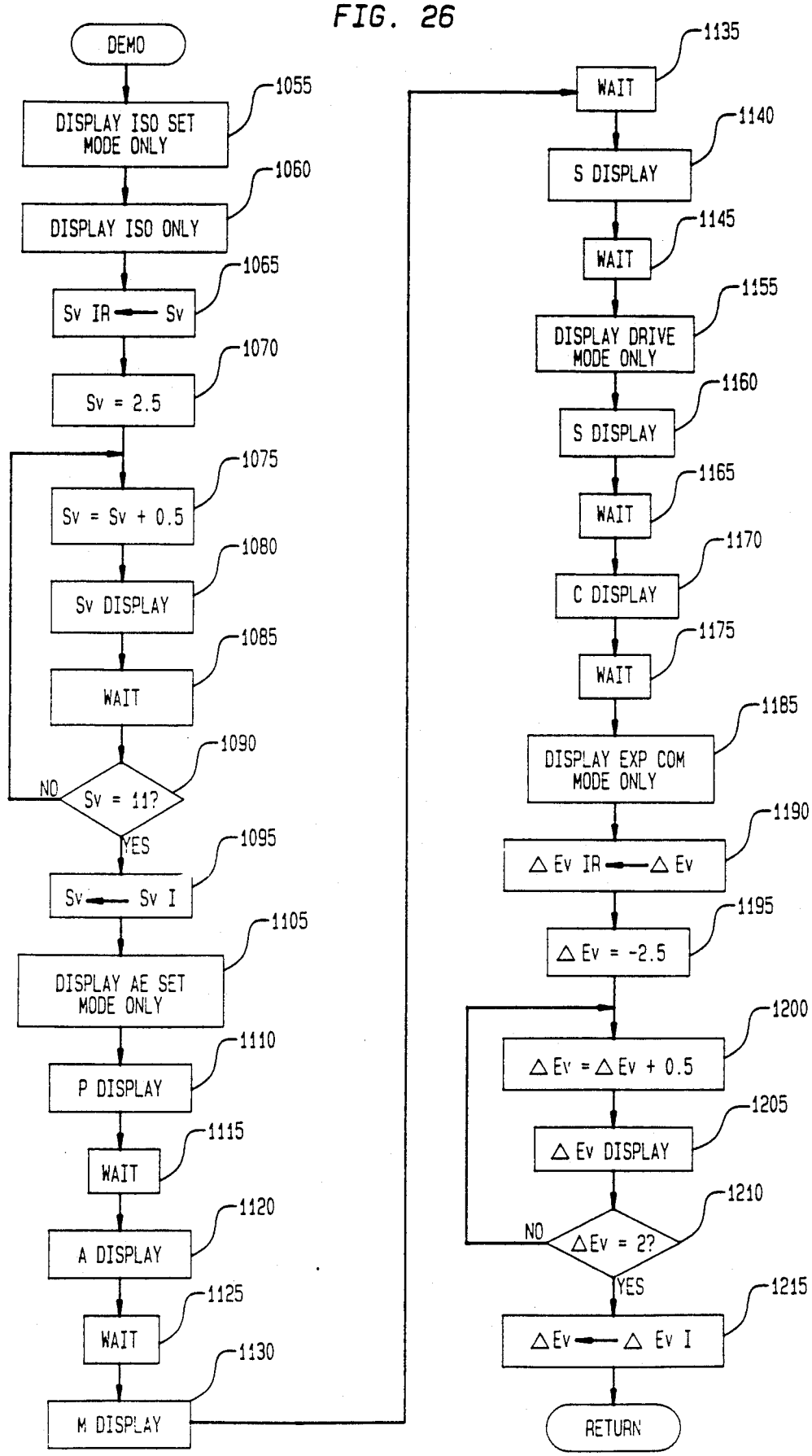
FIG. 26 is a flow chart showing DEMO-routine.
Figure 26:
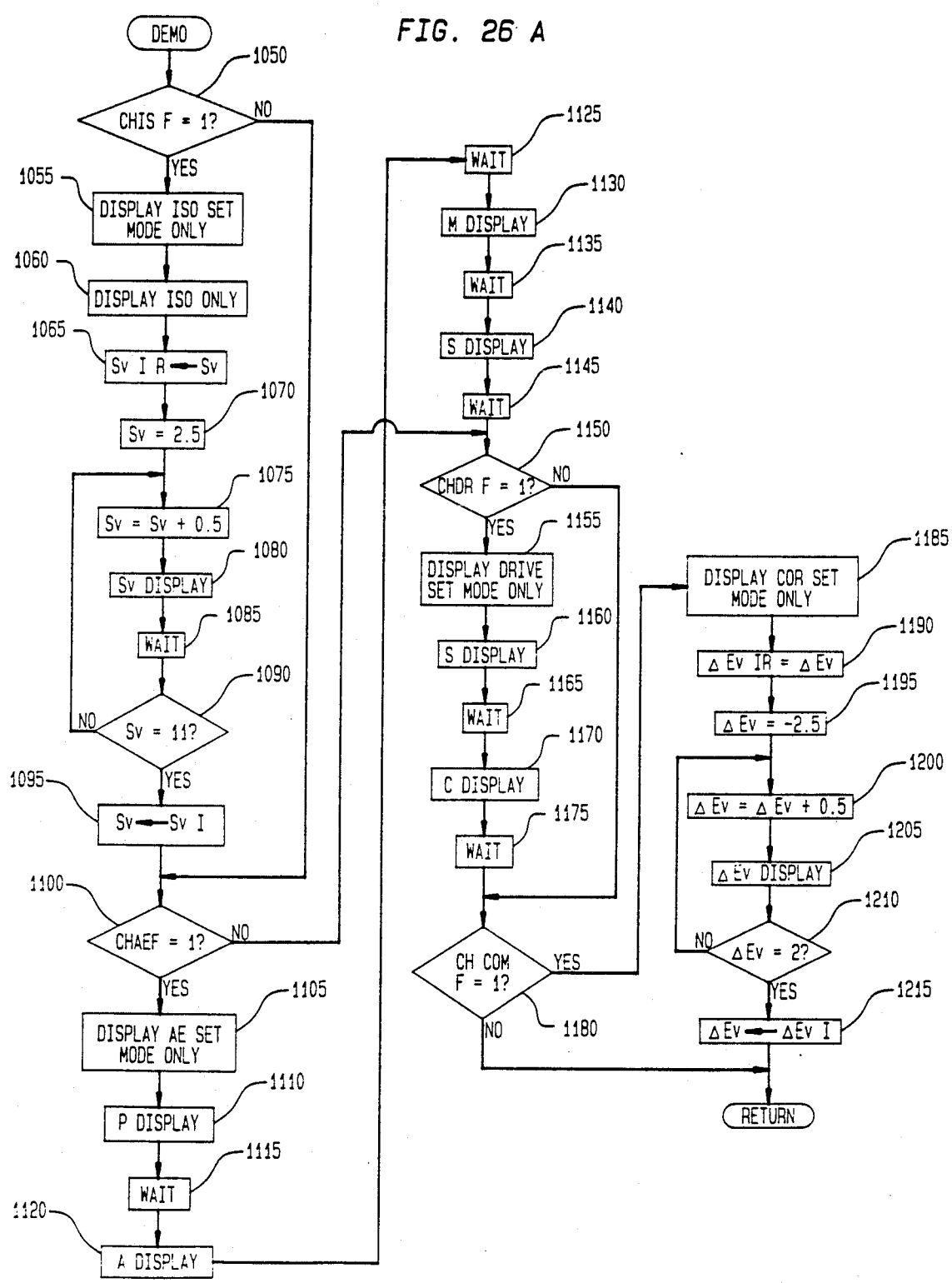

A flow chart of DEMO subroutine is explained referring to FIG. 26.

When it is started, the micro-computer MC displays only "ISO" among mode-indications shown in FIG. 6 at step #1055. Then, at step #1060, only "ISO" is indicated among indications shown in FIG. 12. Next, the sensitivity of film memorized is registered in a register SvIR once and the sensitivity is set to an initial value of "2.5" (step #1065, #1070). At step #1075, "0.5" is added to the sensitivity Sv and the result is numerically displayed at step #1080. This value "3.0" corresponds to "ISO25" which is the minimum value being able to set in the camera. The process waits for a short time in order to prevent a successive alteration and the sensitivity Sv is displayed repeatedly by adding "0.5" until Sv becomes equal to 11 (which corresponds to "ISO3200" at steps #1085 and #1090).

And, from step #1095, the sensitivity SvI having been memorized in the register SvIR is set as a regular sensitivity Sv to proceed to step #1105.

At step #1105, only indications "PAMS" for AE modes are displayed in the display of FIG. 6. Then, in the display of FIG. 12, each of P, A, M, S modes is displayed cyclically such as "P"→"A"→"M"→"S" at steps #1110 to #1145. A waiting time is set between two successive displays and, therefore, individual indications are displayed discontinuously inbetween the waiting time (steps #1115, #1125, #1135, #1145).

Next, the micro-computer proceeds to step #1155 and displays only "DRIVE" among indications of FIG. 6. Then, it displays drive mode indications "S" and "C" in the order of "S" to "C" at steps #1160 to #1175. A waiting time is also provided for avoiding continuous indications.

Next, the micro-computer displays only "+/−" which indicates the exposure compensation amount setting mode at step #1185. Then, it memorizes the exposure compensation amount ΔEv of "−2.5" having been memorized into a register ΔEvIR once at step #1190 and the exposure compensation amount ΔEv is set at "−2.5" at step #1195. Then, at step #1200, "0.5" is added to ΔEv and the result is numerically displayed including a negative sign thereof at the lower portion of the display 1 shown in FIG. 12 (for example, "−2.0"). At that time, all other indications are turned off. The exposure compensation amount ΔEv is displayed repeatedly by adding "0.5" thereto until it becomes equal to 2.0 (step #1210). When the exposure compensation amount ΔEv becomes equal to "2.0", the process returns after rememorizing the exposure compensation amount ΔEvI memorized in the register ΔEvIR.

FIG. 26A shows a DEMO routine for the case in that at least one of three modes can be set and altered with one IC card.

Hereinafter differences between FIG. 26 and FIG. 26 A are explained. In this DEMO routine, a check mode for checking individual flags each of which indicates that the mode is able to set or alter is introduced before the step for displaying in each mode. Steps corresponding to the check mode are #1050, #1100, #1150 and #1180. If the corresponding mode is not able to set or alter, displays in the mode are omitted.

VARIATION of the preferred embodiment

Figure 27:
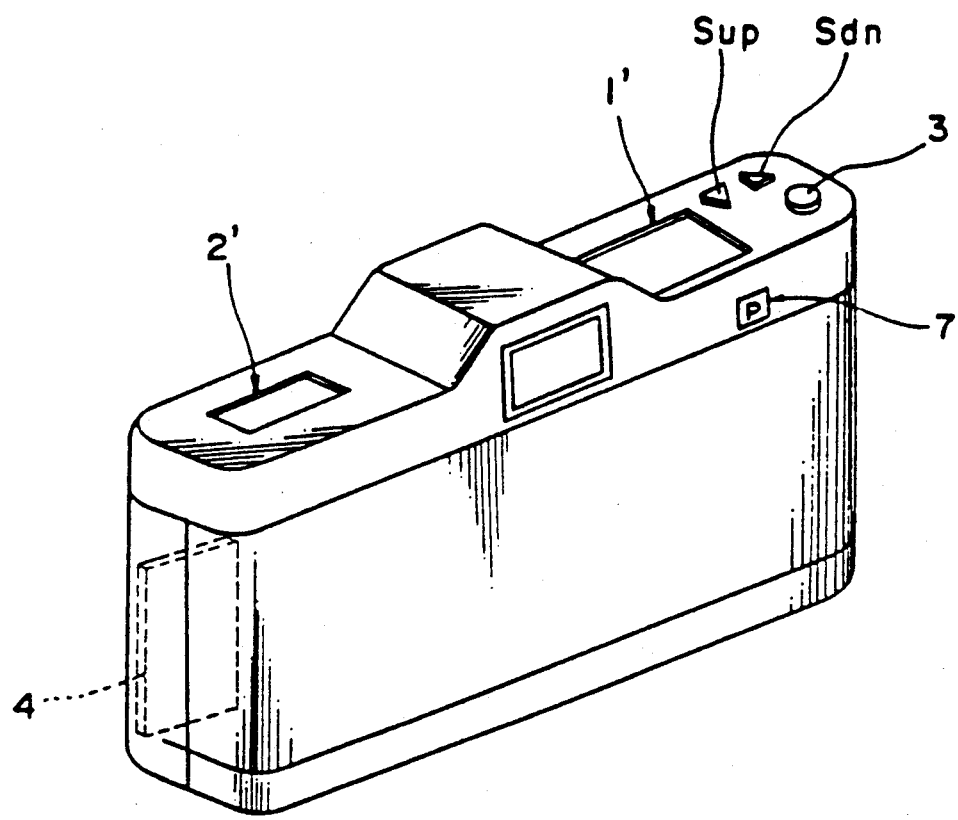
FIG. 27 is a rear perspective view of a camera according to a variation of the present invention.

Next, a variation of the mode-set alteration switch is shown in FIG. 27. A mode set alteration switch 2' is a single switch of normal open type and has not displaying function. However, by repeating operations of this switch 2', the setting mode is changed such as AE mode setting→ISO setting→exposure compensation amount setting→DRIVE mode setting.

As regards to a display of a mode being able to set and alter, indications such as "ISO", "DRV", "AE" and "+/−" are provided in a display device 1' arranged on the upper wall of the camera body. The indication of a mode designated by an IC card is kept displayed once the IC card has been inserted.

Figure 29:
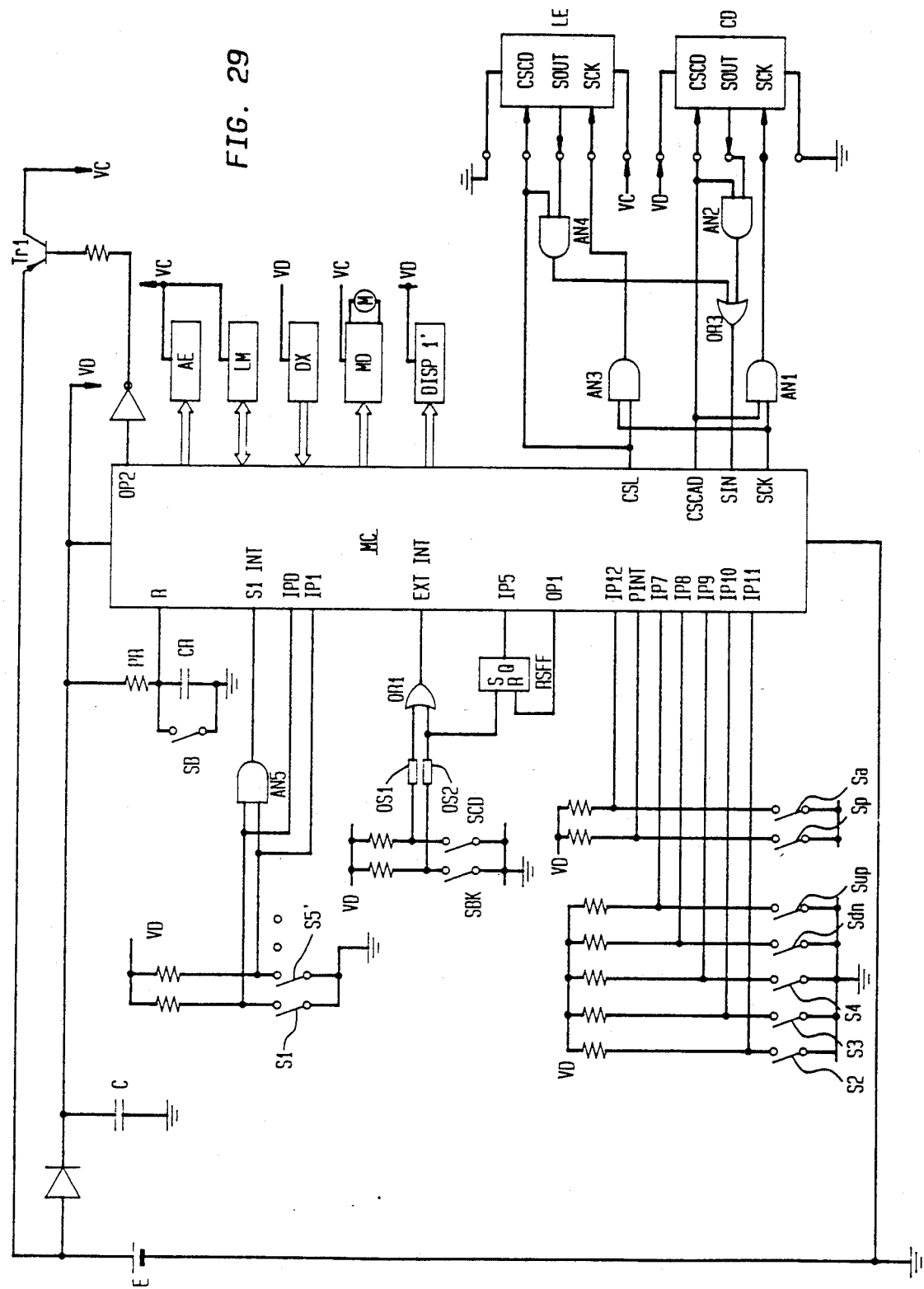
FIG. 29 is a block diagram showing a variation of the control system according to the present invention.
Figure 30:
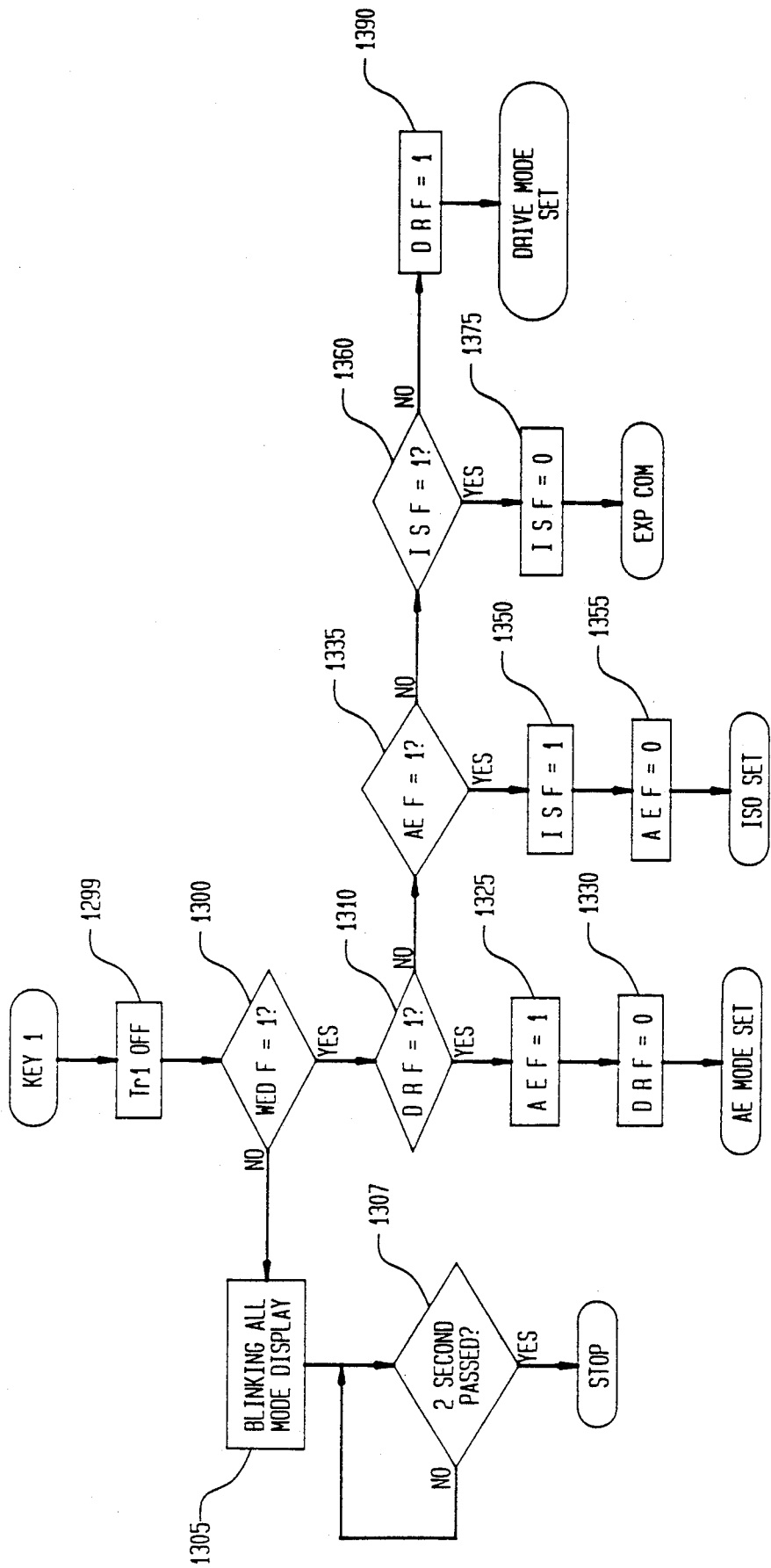
FIG. 30 is a flow chart of a variation of Key 1 subroutine.

The operating method in this variation and control for changing modes at that time are explained referring to a block diagram of a control circuit shown in FIG. 29 and a flow-chart shown in FIG. 30. FIG. 29 is a variation of the block diagram of FIG. 4. Differences from FIG. 4 are three points as follows:

that Mode setting switches S5 to S8 are replaced to a single mode set alteration switch S5' (which corresponds to the switch 2' of FIG. 28), that the input ports IP1 to IP4 are replaced to one input port IP1' and that only one display device DISP1' (which corresponds to the liquid crystal display device 1') is provided.

FIG. 30 shows a variation of Key 1 routine shown in FIG. 11 which corresponds to step #395 of the flow chart of S1INT shown in FIG. 10.

The mode set alteration of this type will be explained referring to this flow chart. When the mode set alteration switch S5' is operated, S1INT subroutine of FIG. 10 is executed and, then, the process proceeds from step #255 to Key 1 routine shown in FIG. 30 since this does not means that the ready switch S1 is switched on. In Key 1 routine, the micro-computer MC turns off the power transister Tr1 at step #1299, and checks whether the set alteration OK flag WEDF has been set or not. If it has not been set, four displays "ISO", "DRV", "AE" and "+/−" among displays of DISP1' are blinked to warn for 2 seconds and then, the process is stopped (steps #1305 and #1307).

If the flag WEDF has been set, DRIVE MODE setting flag DRF is checked. If it has been set, namely, the latest mode is DRIVE mode setting, AE mode flag AEF is set to select AE mode setting at step #1325 and DRIVE mode flag DRF is reset at step #1330. Then, the process proceeds to AE mode setting routine (FIG. 15).

If the flag DRF has not been set, the flat AEF is checked at step #1335. If it has been set, the flat ISF for setting ISO is set at step #1350 and the process proceeds to an ISO setting subroutine (FIG. 14) after resetting the flag AEF. If the flag AEF has not been set, the process proceeds to step #1360 to check whether the flag ISF has been set or not. If it has been set, the process proceeds to an exposure compensation routine (FIG. 16) after resetting the flag ISF at step #1375. If the flat ISF has not been set, the flag DRF for setting DRIVE mode is set in order to execute DRIVE mode setting routine at step #1390.

Figure 28:
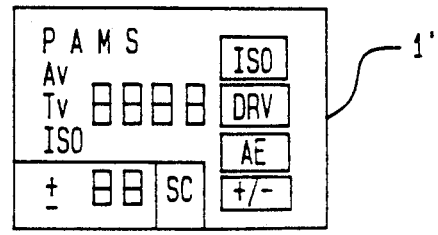
FIG. 28 is a plan view of the display device shown in FIG. 27.

Individual mode setting routine are same to those shown in FIGS. 13 to 16, respectively and displays shown in FIG. 28 are controlled in the same manner as explained with respect to FIG. 12 except for indications "ISO", "DRV", "AE" and "+/−".

Figure 31:
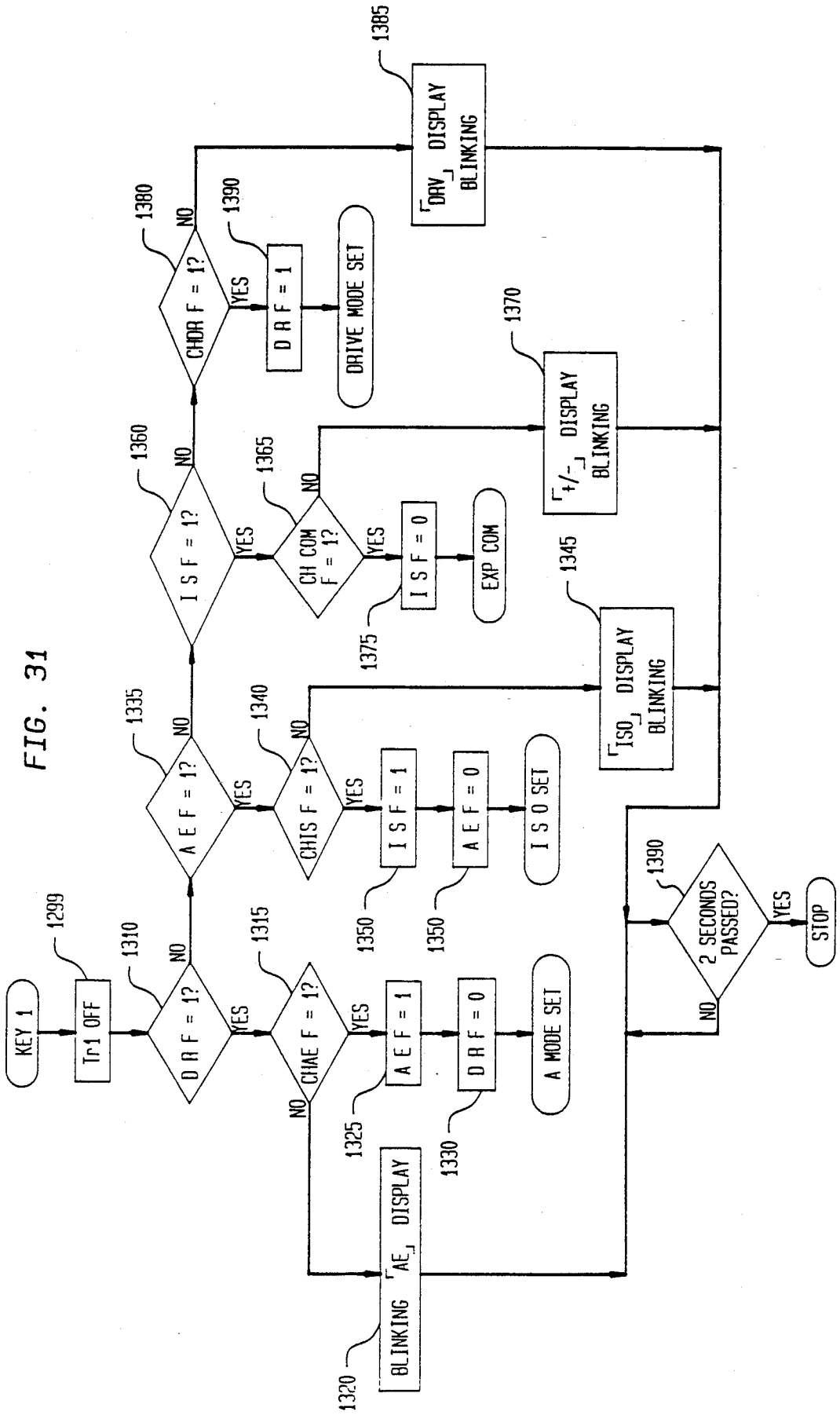
FIG. 31 is a flow chart of another variation of Key 1 subroutine.

FIG. 31 shows a variation of FIG. 30 which is provided for the case in that the number of modes being able to set or alter by one IC card is either one of "1" to "3". In this case, the mode for setting or altering is displayed when it is added and kept displayed thereafter as explained in FIGS. 7 and 8.

As is apparent from the comparison with FIG. 30, steps #1315, #1340, #1365 and #1380 for deciding whether individual set alteration modes are able to set or not are added, based upon flags CHAEF, CHISF, CHCOMF AND CHDRF memorized in an IC card, respectively. These steps are provided in replace of steps #1300 to #1307 for blinking all mode indications in order to warn a mode being impossible to set by blinking an indication corresponding thereto.

If individual flags have been set, namely, corresponding modes are designated, each mode is set in the manner same to that of FIG. 30.

If either one of the flags has not been set, the corresponding mode indication is blinked for 2 seconds in order to warn that the mode is impossible to set and, then, the process is stopped (steps #1320, #1345, #1370, #1385 and #1390).

Figure 32:
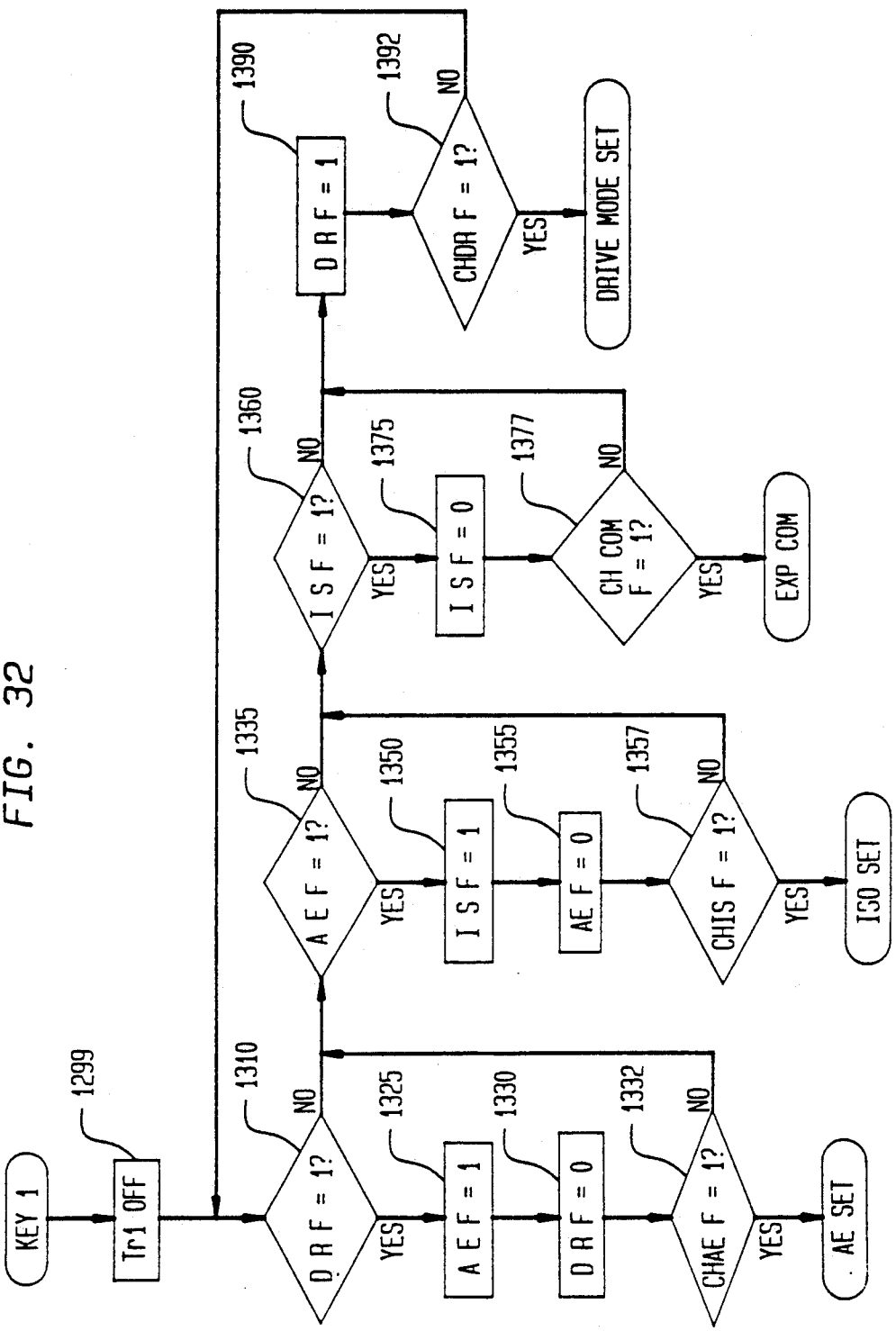
FIG. 32 is a flow chart of one more variation of Key 1 subroutine.

Among steps of FIG. 31, steps having same numbers as those of FIG. 30 are identical to the latter. Though the mode being impossible to set is warned by blinking the corresponding mode indications in the variation of FIG. 31, according to another variation shown in FIG. 32, only modes being possible to set are treated cyclically without warning. According to this method, a user can recognize modes impossible to set and choose a desirable mode speedy.

More concretely, as is apparent from the comparison with FIG. 31, decision steps #1332, #1357, #1377 and #1392 for checking flags indicating modes being possible to set are inserted before proceeding individual mode setting subroutines, respectively. If either one of flags has been set, the process proceeds to the corresponding setting mode. If it has not been set, the process proceeds to a step for deciding whether the next mode can be set or altered. Namely, if the process is at step #1332 for deciding whether AE setting mode can be altered or not, it proceeds from step #1332 to step #1335. If the process is at step #1357 for deciding whether ISO setting mode is to be executed or not, it proceeds from step #1357 to step #1360 and if it is at step #1377 for deciding whether the exposure compensation is to be altered or not, it proceeds from step #1377 to step #1390. If it is at step #1392 for deciding whether DRIVE mode alteration is to be done or not, it proceeds from step #1392 to step #1310.

In the preferred embodiment mentioned above, an IC card is mounted on the front wall of the camera body. But, it can be mounted onto the back lid of the camera if it is necessary.

There may be provided as IC cards for making setting and/or altering functions as follows;

IC card capable of program shift function,

IC card capable of highlight-based exposure and/or shadow-based exposure,

IC card capable of switching from single shot AF (auto-focusing) mode to continuous shot AF mode if the camera has only single shot AF mode, IC card capable of switching from AF priority mode to release priority mode or vice versa if the camera has an AF function and IC card capable of setting various intervals for a self-timer installed in the camera.

The preferred embodiments described herein are illustrative and not restrictive, the scope of the invention being indicated by the appended claims and all variations which come within the meanings of the claims are intended to be embraced herein.

What is claimed is:

1. A camera capable of functioning in accordance with a plurality of types of data received from an external device comprising:
   means for receiving the data values from said external device;
   means for identifying the type of data values received by said receiving means;
   means for displaying an exposure data value; and
   means for controlling said displaying means to display the type of data value identified by said identifying means in place of the exposure data value.

2. A camera according to claim 1 wherein the exposure data value is shutter speed.

3. A camera according to claim 1 wherein the exposure data value is aperture size.

4. A camera capable of functioning in accordance with data from an external device, comprising:
   means for receiving data from said external device;
   means, responsive to data received by said receiving means, for setting an exposure control mode in which said camera is operable;
   means, responsive to data received by said receiving means, for enabling at least one operation of said camera except the setting of the exposure control mode; and
   means for displaying information, including first display means for making a display indicating the exposure control mode set by said setting means and second display means for making a display indicating the operation of said camera enabled by said enabling means.

5. A camera according to claim 4 wherein said displaying means comprising one display device.

6. A camera according to claim 4 wherein said camera is selectively operable in one of a plurality of exposure control modes without the received data from said external device and said displaying means further including third displaying means for making a display indicating the selected exposure control mode.

7. A camera capable of functioning in accordance with data from an external device, comprising:

means for receiving the data from said external device;

means, responsive to the received data, for setting one of a plurality of programmed automatic exposure control modes which are enabled to be set in accordance with the received data to automatically determine an aperture value and a shutter speed; and display means for displaying the programmed automatic exposure control mode set by said setting means, said displaying means including a first display part indicating a programmed automatic exposure control mode which is commonly displayed in spite of the set programmed automatic exposure control mode and second display part indicating the type of set programmed automatic exposure control mode.

8. A camera capable of functioning in accordance with data including control data from an external device comprising:

means for receiving said data from said external device;

a first manually operable means for designating one parameter among parameters for determining predetermined operation modes of said camera;

means for controlling said first manually operable means which prohibits the designation of a parameter by said first manually operable means except when said receiving means has received data from said external device; and a second manually operable means for setting values of data indicating contents of said one parameter designated by said first manually operable means when allowed by said control means.

9. A camera according to claim 8 further comprising means for displaying parameters for determining operation modes of said camera only when said controlling means allows the designation of parameter by said first manually operable means.

10. A camera capable of functioning in accordance with data including control data from an external device, comprising:

means for receiving data from said external device;

manually operable means for designating one parameter among parameters for determining predetermined operation modes of said camera;

means for controlling said manually operable means which prohibits the designation of parameter by said first manually operable means except when said receiving means has received data from said external device; and means for displaying said parameters to be designated by said first manually operable means when allowed by said control means.

* * * * *